(12) United States Patent
Schmouker et al.

(10) Patent No.: US 12,289,497 B2
(45) Date of Patent: Apr. 29, 2025

(54) METHOD FOR SHARING CONTENT AND CORRESPONDING APPARATUSES

(71) Applicant: INTERDIGITAL MADISON PATENT HOLDINGS, SAS, Paris (FR)

(72) Inventors: Philippe Schmouker, Betton (FR); Thomas Morin, Saint-Gregoire (FR); Hassane Guermoud, Thorigne Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 18/035,207

(22) PCT Filed: Nov. 2, 2021

(86) PCT No.: PCT/EP2021/080394
§ 371 (c)(1),
(2) Date: May 3, 2023

(87) PCT Pub. No.: WO2022/096461
PCT Pub. Date: May 12, 2022

(65) Prior Publication Data
US 2023/0421853 A1   Dec. 28, 2023

(30) Foreign Application Priority Data

Nov. 3, 2020 (EP) .................................... 20306316

(51) Int. Cl.
*H04N 21/472* (2011.01)
*H04N 21/845* (2011.01)

(52) U.S. Cl.
CPC ..... *H04N 21/47202* (2013.01); *H04N 21/845* (2013.01)

(58) Field of Classification Search
None
See application file for complete search history.

(56) References Cited

U.S. PATENT DOCUMENTS

2009/0288120 A1  11/2009  Vasudevan et al.
2011/0246495 A1  10/2011  Mallinson
(Continued)

OTHER PUBLICATIONS

Ringen, Jonathan, "Here's What Happened When MTV Met Gen-Z", Fast Company Magazine, URL: https://www.fastcompany.com/40474520/heres-what-happened-when-mtv-met-gen-z, Oct. 17, 2017, 3 pages.

(Continued)

*Primary Examiner* — James R Marandi
(74) *Attorney, Agent, or Firm* — Condo Roccia Koptiw LLP

(57) ABSTRACT

A user may want to share segments of content, such as video sequences of news reporting or sports events received from a service provider, SR, or content provider, CP, with the members of his social network using the user's social networking application. Therefore, a method is provided for sharing content that may include receiving a content segment by a Transmitter/Receiver Device, TRD. The TRD may transmit, to the SP/CP, a request for sharing the currently received content segment. The SP/CP may receive the request from the TRD and may prepare the content segment for sharing, for example by uploading it to a replay platform. The TRD may receive, from the SP/CP an indication that the content segment has been stored on the replay platform, including a locator to the content segment. The TRD may publish the locator in the user's social network application.

14 Claims, 19 Drawing Sheets

(56) References Cited

U.S. PATENT DOCUMENTS

| | | |
|---|---|---|
| 2013/0166652 A1 | 6/2013 | Conway et al. |
| 2014/0215333 A1* | 7/2014 | Dhanyamraju .... H04N 21/8455 715/716 |
| 2015/0100979 A1 | 4/2015 | Moskowitz et al. |
| 2018/0219924 A1* | 8/2018 | Nagabushanam ...... H04L 67/10 |

OTHER PUBLICATIONS

Porro, Pauline, "TV Channels are chasing young people", INA: The Media Review, Jan. 22, 2018, 8 pages.

* cited by examiner

METHOD FOR SHARING CONTENT AND CORRESPONDING APPARATUSES

CROSS REFERENCE TO RELATED APPLICATIONS

This application is a U.S. National Stage Application under 35 U.S.C. § 371 of International Patent Application No. PCT/EP2021/080394, filed 2 Nov. 2021, which is incorporated herein by reference in its entirety.

This application claims priority to European Application No. 20306316.9, filed 3 Nov. 2020, which is incorporated herein by reference in its entirety.

FIELD

The present disclosure generally relates to the field of content sharing, and in particular to the sharing of content though publication of links or locators to the content, e.g., on social network platforms.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

While linear television has been around since a long time, the relatively recent advent of high-speed Internet access has largely contributed to the nowadays massive popularity of on-demand streaming. Content providers may propose both types of video content delivery models. For example, a TV program may, after having been broadcasted, be provided on the Internet for on-demand replay, thereby creating additional opportunities for content editors and content providers to further disseminate content, and creating additional opportunities for content consumers to watch content at their convenience.

There is a need to further improve the dissemination of content in the content distribution chain.

SUMMARY

According to one aspect of the present disclosure, there are provided methods implemented by a receiver device, according to the described embodiments and appended claims.

According to a further aspect of the present disclosure, embodiments of a receiver device implementing at least one of the methods are described and claimed in the appended claims.

According to a second aspect of the present disclosure, there are provided methods implemented by a server, according to the described embodiments and appended claims.

According to a further aspect of the present disclosure, embodiments of a server implementing at least one of the methods are described and claimed in the appended claims.

According to a further aspect of the present disclosure, embodiments of a system implementing at least one of the methods are described and claimed in the appended claims.

BRIEF DESCRIPTION OF THE DRAWINGS

More advantages of the present disclosure will appear through the description of particular, non-restricting embodiments. To describe the way the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure. The embodiments will be described with reference to the following drawings in which.

Figure 1:
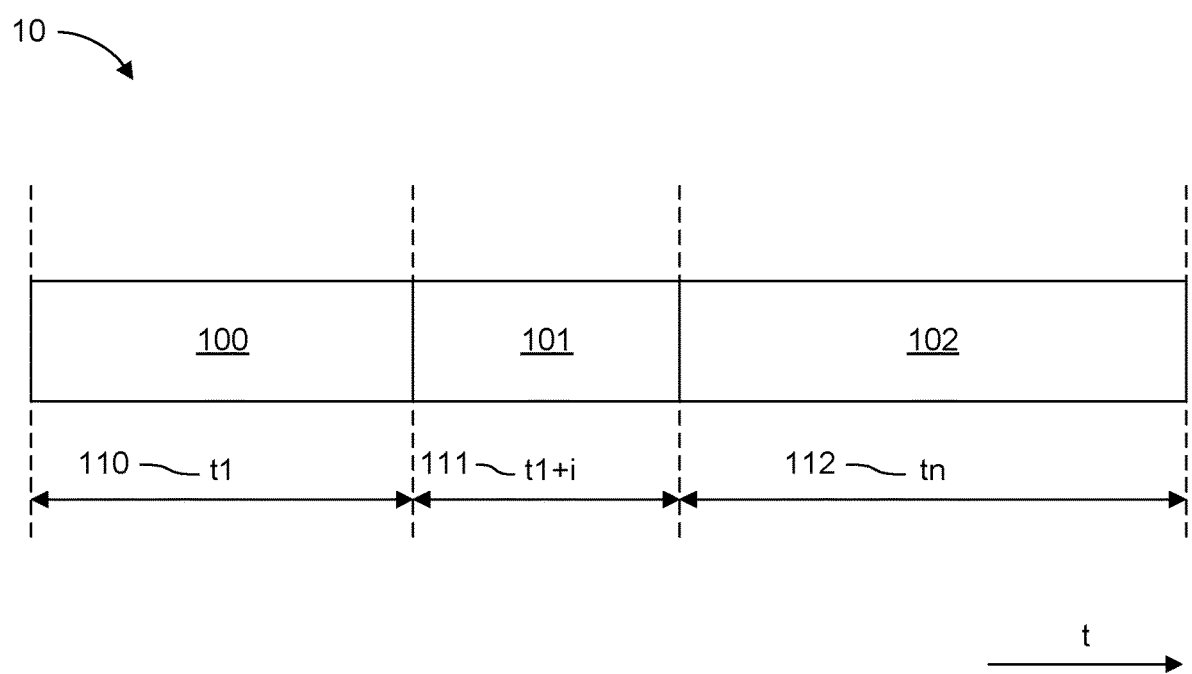
FIG. 1 is a timeline illustrating a program/content being a succession of events or sequences, each sequence having an associated duration.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As set forth in the background section, while linear television has been around since a long time, the relatively recent advent of high-speed Internet access has largely contributed to the nowadays massive popularity of on-demand streaming. Content providers may propose both types of video content delivery models. For example, a TV program may, after having been broadcasted/streamed, be provided on the Internet for on-demand replay. In the following, the term broadcast is used to indicate broadcasting or streaming content (linear content) at a specific date and time for linear consumption. A same linear content may for example be transmitted/streamed over satellite or terrestrial radio channels, cable, or the Internet or a digital transmission backbone (multicasting), to many users at a same time. The broadcasted/streamed linear content may be live or not. An example of a live linear content is a live sports event, or a live talk show, or a live news program. An example of a non-live linear content is a movie or a documentary. A (live) linear content may be rendered available on a replay platform once the content has been fully transmitted (broadcasted/streamed).

Broadcasted or (live) streamed content may, once it has become available for replay, be shared between users through content locators giving access to the content. A typical example of such content locator ('locator') is a Uniform Resource Locator, URL, or Uniform Resource Identifier, URI. A user may copy the locator of a previously broadcasted content and then share it with the members of his/her social- or microblogging network. A (live) stream or broadcast, such as a news program (newscast), that reports current events, or a sports program, may thus be rendered accessible for replay and sharing after the transmission/broadcasting/streaming of the program has finished.

However, a news program for example typically contains short, non-related subjects, and a user may be interested in sharing only one of these subjects with the members of his social network. Likewise, a sports program may include events of a relatively short duration (such as a goal, a point scored) that may be of particular interest to a viewer. If, for example, a two-minute subject of particular interest for a user is broadcasted at the beginning of a 30-minute news program, the user has to wait at least thirty minutes, and probably more, until the news program has ended and the provider renders the news program available for replay, before being able to share the locator of the news program with the members of his social network. Likewise, a user may want to share, with the members of his social network(s), a particular sequence in a sports program, corresponding, for example to a goal or point scored. In any case, the user will have to wait for the full video to be published on the provider's web page (replay platform) before being able to share it. Also, a user may have some difficulty to find, in the full video once it has become available on the replay platform, the exact moment corresponding to the event(s) of interest. Then, time is lost for the user who wants to react instantly on a current subject or event. In the worst case, the content may not be shared at all by the user because of the delay between the broadcast/streaming and its availability on the replay platform, as the user may have lost interest, the user may be weary of waiting for the content to become available, the user may find it too cumbersome to fast forward to the moment of interest in the full video, or the user may simply forget to interrogate the replay platform for the content after a while. For the content provider, opportunities to disseminate the content, to place advertisements and to create additional revenues, are then lost. For the user, interesting further functionalities are not provided.

In the following, the terms (content) (video/audio) sequence, (content) (video/audio) segment, (content) (video/audio) part are used indifferently, meaning a part of a video or audio content (e.g., of a movie, a sports program, a news program, a music event). The part of the content may be sequential with another part. E.g, a content, when split in three parts, may have three sequential parts such that different sequential parts of the content, for example a first part (first content segment), a second part (second content segment), a third part (third content segment), until an nth part (nth content segment), the first part (first content segment) to the nth part (nth content segment) represents a (an entire) content.

FIG. 1 is a timeline 10 illustrating a content (e.g., a (live) news program, a (live) talk show, a (live) sports event) being a succession of events or (content) segments, 1 (100) to n (102), each segment (100, 101, 102) having an associated duration $t_i$ (110) to $t_n$ (112). According to an example scenario, for any segment #n that is currently (being) broadcasted (for n>1), every preceding segment #(n−k) (for 0<k<n) may have been uploaded by the content provider to a replay platform, but currently broadcasted segment #n is not yet uploaded to the replay platform.

According to an embodiment, a currently broadcasted segment may be marked for sharing by a viewer, while the segment has begun (broadcasting of the segment has started) but has not ended yet (broadcasting of the segment has not ended, i.e., broadcasting of the segment is ongoing). For example, during viewing of the segment, the viewer may indicate his interest to the content provider to share the segment while broadcasted, once the segment has become available for replay.

According to embodiments described in further sections, different modes of operation are proposed, among which are Push Mode, Semi Pull mode, and Full Pull mode.

Push Mode

This is a mode of operation which a Client-Side is involved as little as possible for the automation of share processing on users' social network accounts. Shares being operated on the server side (i.e. the Server-Side), automation is easier to ensure. Within the context of this mode of operation, users may accept that the Server-Side manages some content sharing on the social network accounts of these users. While this mode of operation may require specific user authorization to access a user's social network account, the "PULL-mode" embodiments may not require such authorization and may therefore, advantageously, be more easily accepted by users with specific privacy concerns.

Figure 2:
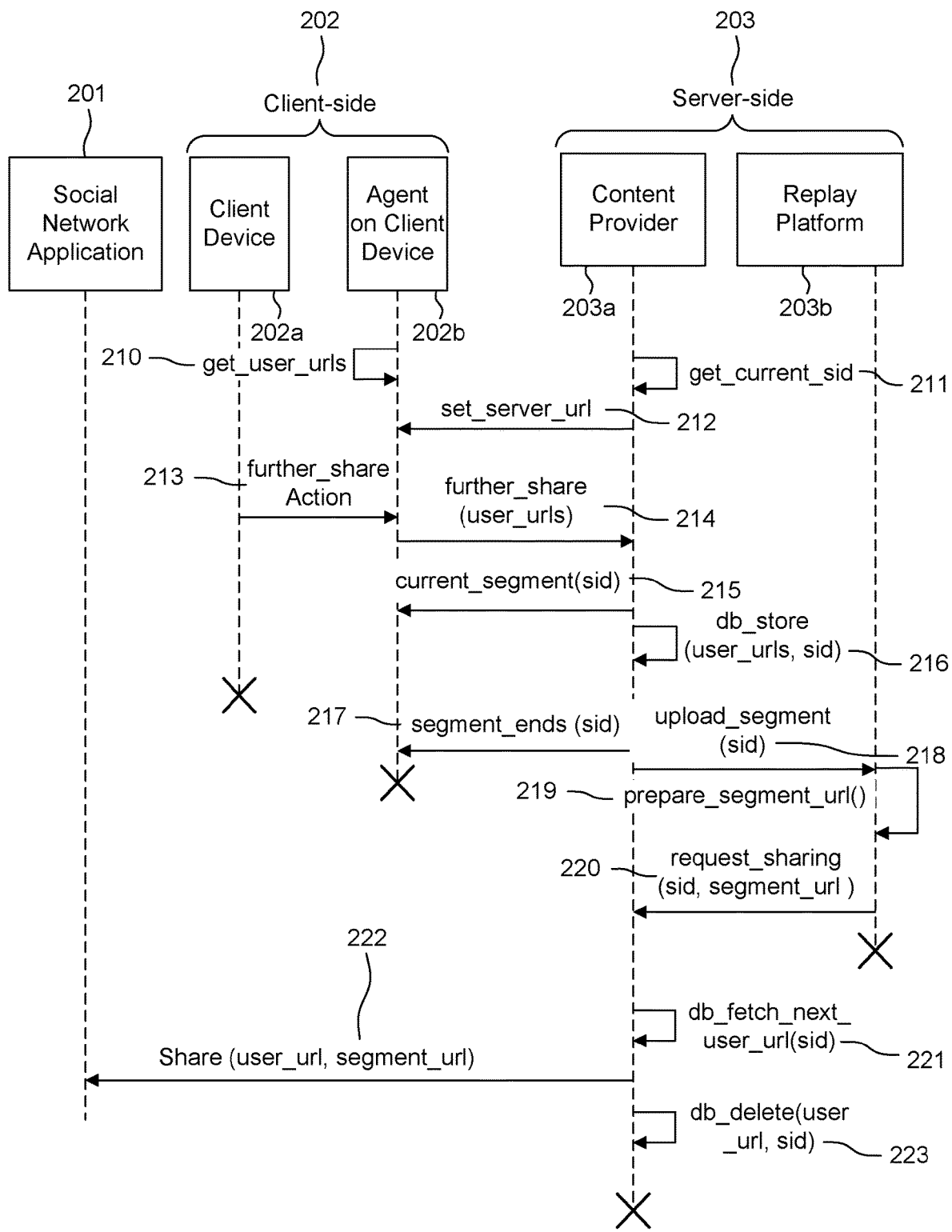
FIG. 2 is a sequence diagram of a push-mode embodiment of a share action.

FIG. 2 illustrates a push-mode embodiment of a share action. Distinguished are a Client-Side 202 (e.g., the content consumer (device) side) and a Server-Side 203 (i.e., the broadcast and content owner/distributor side), as well as an application/a social network application 201 of a user. Each of both the server and the client sides may be constituted of one, two or more actors.

On the Client-Side 202, a user may interact via a client device (or 'client', or 'device') 202a. A list of example client devices is given further on in the present description. The client device 202a, or a user of the client device, can select actions share or cancel via this client device. Those actions are transmitted to an Agent 202b running on the client device. The agent interacts with the Server-Side. The agent is, for example, a software component running on the client device 202a.

On the Server-Side 203, Content Provider 203a broadcasts a content (e.g., a program) that is cut (split, divided, segmented) into smaller segments (content sequences, content segments). Content Provider 203a on Server Side 203 communicates with Agent 202b on Client-Side 202 and Content Provider further communicates with Replay Platform 203b which is also located on Server-Side 203. A replay platform is for example a platform (server or multiple servers) (e.g., a web server, a cloud service) that provides video and/or audio replay services for users, related to content or segments of content that is/are or that has/have been broadcasted.

A share action (i.e., a user/client device action (trigger, selection) that enables the sharing of content) may be implemented as follows:

Once the Agent 202b is activated/selected on the client side 202, the agent 202b may recognize/identify the user (or the client device, or the active user of the client device) and obtains access, 210, to the related/associated user's social network account locators.

The Agent 202b gets informed, 212, of the server locator associated with the Content Provider's service. This information may, for example, be multiplexed in a broadcasted MPEG stream or embedded in HbbTV data tables for instance.

When Content Provider 203a broadcasts a sequence/segment of a content, it memorizes, 211, an associated Segment Identifier (SID) of the currently broadcasted segment and provides, 212, to the Agent, the server locator that is associated with its service—see above bullet.

When a Client (user device/client device) 202a activates/selects a share (i.e., by means of hitting a key, clicking or tapping on a graphical button or icon, etc.), this triggers transmission of a further share action 213 from the user (client device) 202a to the Agent 202b.

So activated/selected, Agent 202b transmits a further_share action 214 to the Content Provider 203a server and associates all, some or at least one, of the user's social network account(s) locator(s).

The Content Provider 203a may transmit, 215, to the Agent 202b the SID of the currently broadcasted segment—this is an optional feature that may be useful for local application purposes.

The Content Provider 203a stores, 216, in a database (memorizes) the locator of the user's social network accounts locators associated with the SID of the currently broadcasted segment.

Once the broadcasting of a current segment completes (has ended), the Content Provider 203a may inform, 217, the Agent 202b of its completion (ending).

The Content Provider 203a then uploads, 218, the segment on the content owner's Replay Platform.

The Replay Platform 203b elaborates (defines), 219, the locator of the uploaded segment.

The Replay Platform 203b requests then, 220, the sharing of the locator to the Content Provider 203a.

The Content Provider 203a runs through recorded users' share action(s), 221, obtains locator(s) of user's social network account(s) that is/are associated with the segment and takes any appropriate action, 222, to share the replay locator on the user's social network account(s).

The Content Provider 203a may then delete, 223, the memorized locators of the user's social network accounts.

Figure 3:
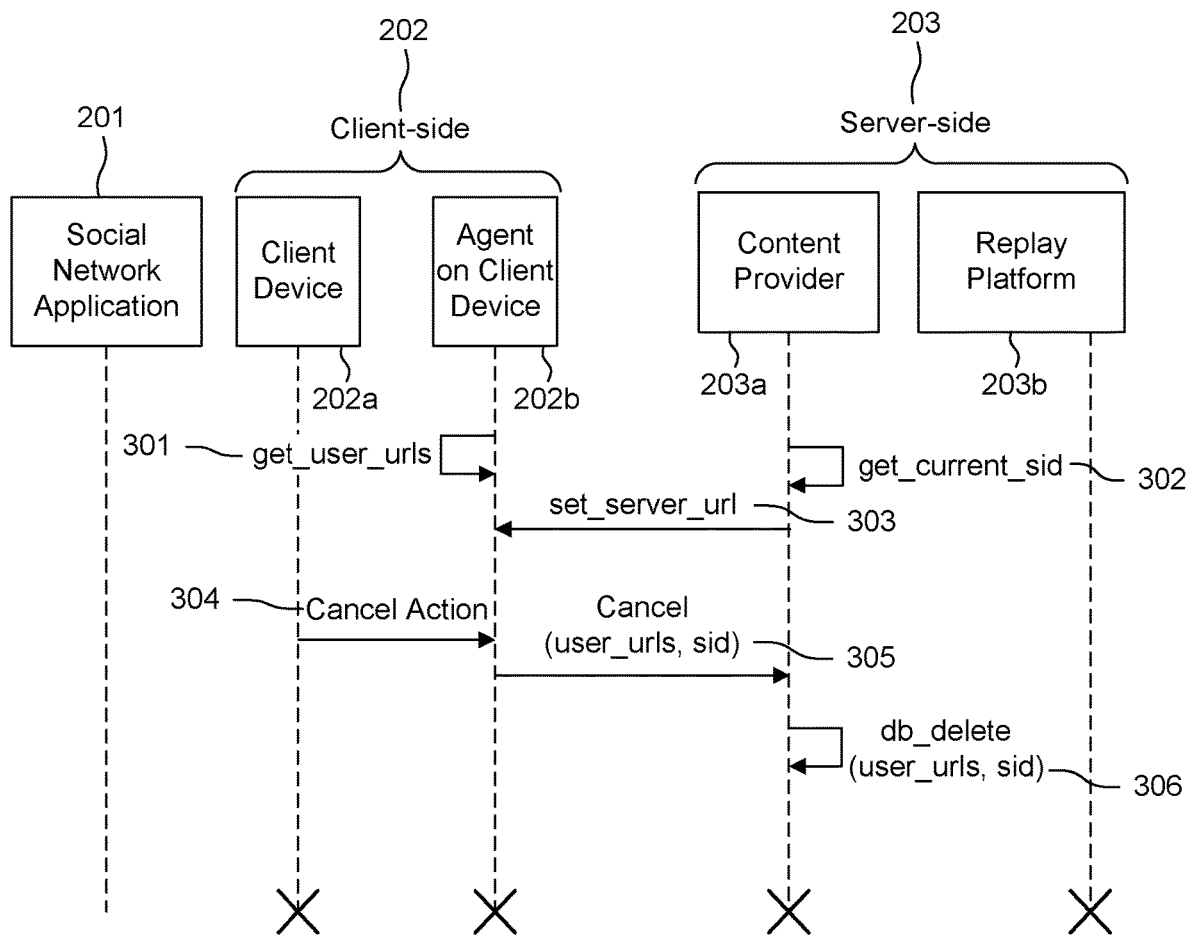
FIG. 3 is a sequence diagram of an embodiment of a cancel action related to the push-mode share action.

According to an embodiment, a user (user device) may cancel any former share action(s). This is illustrated in FIG. 3.

As per the share action, the Agent 202b and the Content Provider 203a are involved in the same way:

Once the Agent 202b is activated on the client side 202, the agent recognizes/identifies the user (client device) and obtains, 301, access to the user's/client device's social network account(s) locator(s).

The Agent 202b gets also informed, 303, of the server locator associated with the Content Provider's service.

When the Content Provider 203a broadcasts a segment from a current content, it memorizes, 302, the associated Segment Identifier (SID) and provides, 303, the server locator that is associated with its service, see above bullet—implementation is explained later.

On a cancel action from the Client (user device, receiver device) 202a then:

When a Client (user device) 202a activates a cancel (i.e., by means of a key hit, or clicking or tapping on a graphical button/icon, etc.), this triggers transmission, 304, of a cancel action to the Agent 202b.

The Agent 202b transmits, 305, a cancel request to the Content Provider 203a, including the segment SID of the currently broadcasted content segment and the user's/client device's social network account(s) locator(s).

On receipt of this request 305, the Content Provider 203a may delete, 306, former share-action records that associate the segment identifier SID and optionally any of the associated user's social network locator(s).

Semi PULL-Mode

Figure 4:
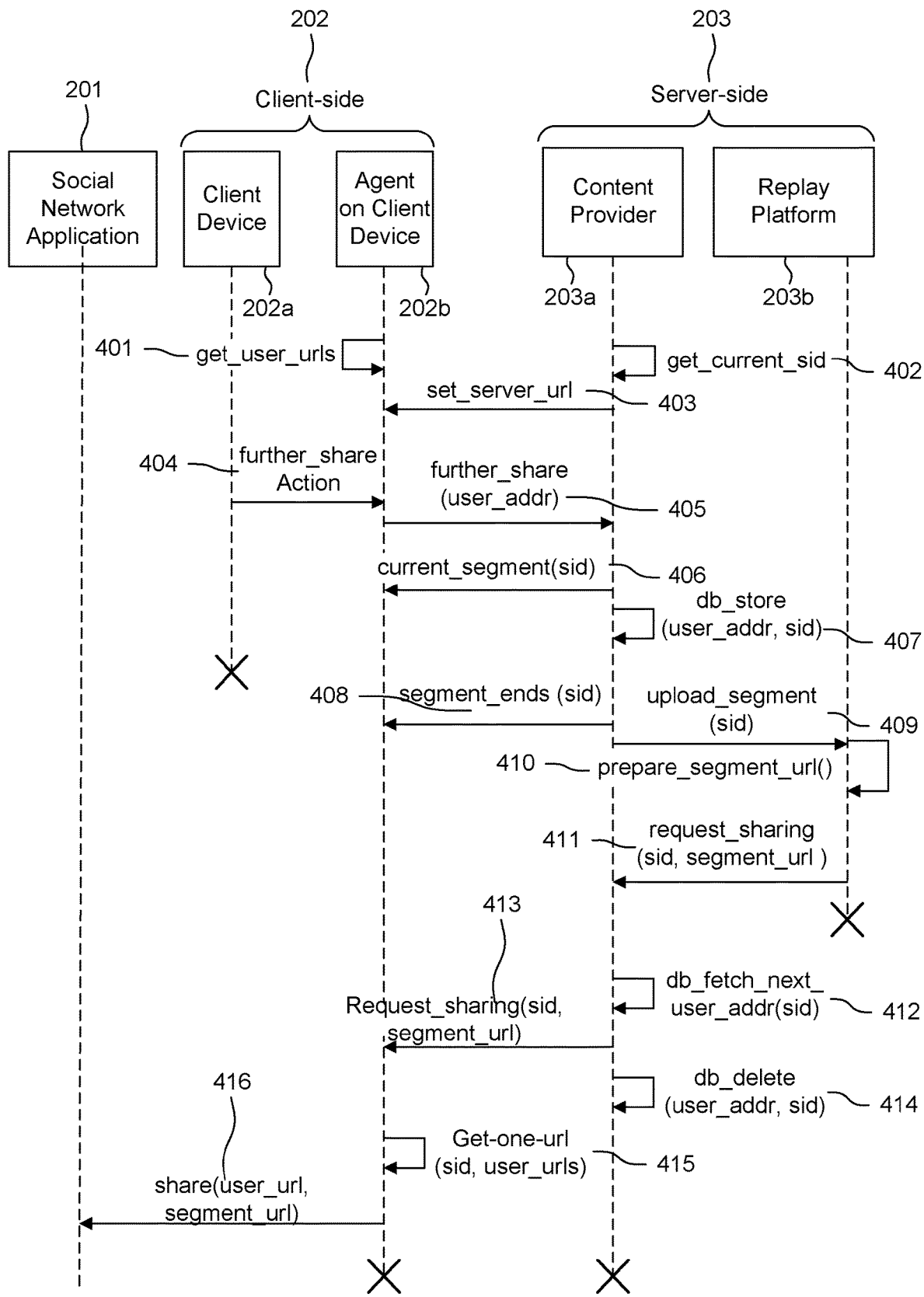
FIG. 4 is a sequence diagram of a semi pull-mode embodiment of a share action.

See FIG. 4. On the Client-Side 202, the client (user device, client device) 202a interacts via a device. A list of example devices is given further on in the present document. The client (device) can select actions share or cancel via the device. Those actions are transmitted to Agent 202b. This actor ensures the interactions with Server-Side 203.

For the share action:

Once the Agent 202b is activated on the client (client device) 202, the agent 202b recognizes/identifies the user/client device and obtains, 401, access to the user's/client device's social network account(s) locator(s).

The Agent 202b gets also informed, 403, of the server locator associated with the Content Provider's service. This information may, for example, be multiplexed in the broadcasted MPEG stream or be embedded in HbbTV data tables for instance.

When the Content Provider 203a broadcasts a segment from a current content (currently broadcasted content segment), it memorizes, 402, the associated Segment Identifier (SID), and provides, 403, the server locator that is associated with its service—see previous bullet.

When a client 202*a* activates share action (i.e., by hitting a key, clicking or tapping on a graphical button, etc.), this triggers transmission of a further share action, 404, to the Agent 202*b*.

Once activated this way, the Agent 202*b* transmits, 405, a further_share action to the Content Provider 203*a* (e.g., to a server of the Content Provider) and associates the Agent locator with this transmission—in the figure, this is referred to as "user_addr".

The Content provider 203*a* may send back, 406, to the Agent 202*b* the SID of the currently broadcasted segment—this is an optional feature that may be useful for local application purposes.

The Content Provider 203*a* stores (memorizes), 407, for example in a database, the locator of the user's Agent associated with the SID of the currently broadcasted segment.

Once the broadcasting of the current segment completes (ends), the Content Provider 203*a* may inform, 408, the Agent 202*b* of its completion (of its ending).

The Content Provider 203*a* then uploads, 409, the completed segment on the Replay Platform 203*b*.

The Replay Platform 203*b* elaborates (defines), 410, the locator of the uploaded segment.

The Replay Platform 203*b* requests then, 411, the sharing of the locator to the Content Provider 203*a*.

The Content Provider 203*a* runs through the recorded users' shares actions, 412, obtains the locator of associated Agent(s) (agent application(s)) 202*b* and requests, 413, a sharing of the newly available segment locator on the users' social network accounts. The Content Provider 203*a* may remove (may delete), 414, also from its server database (or remove from memory) the obtained records that associate with the segment identifier SID.

When Agent 202*b* receives the sharing request, 413, it runs through the user's/client device's social network account(s) locator(s), 415, and takes any appropriate actions, 416, to share the replay locator on the user's/client device's social network(s) account(s) by publication of the locator to the segment available on the replay platform.

Figure 5:
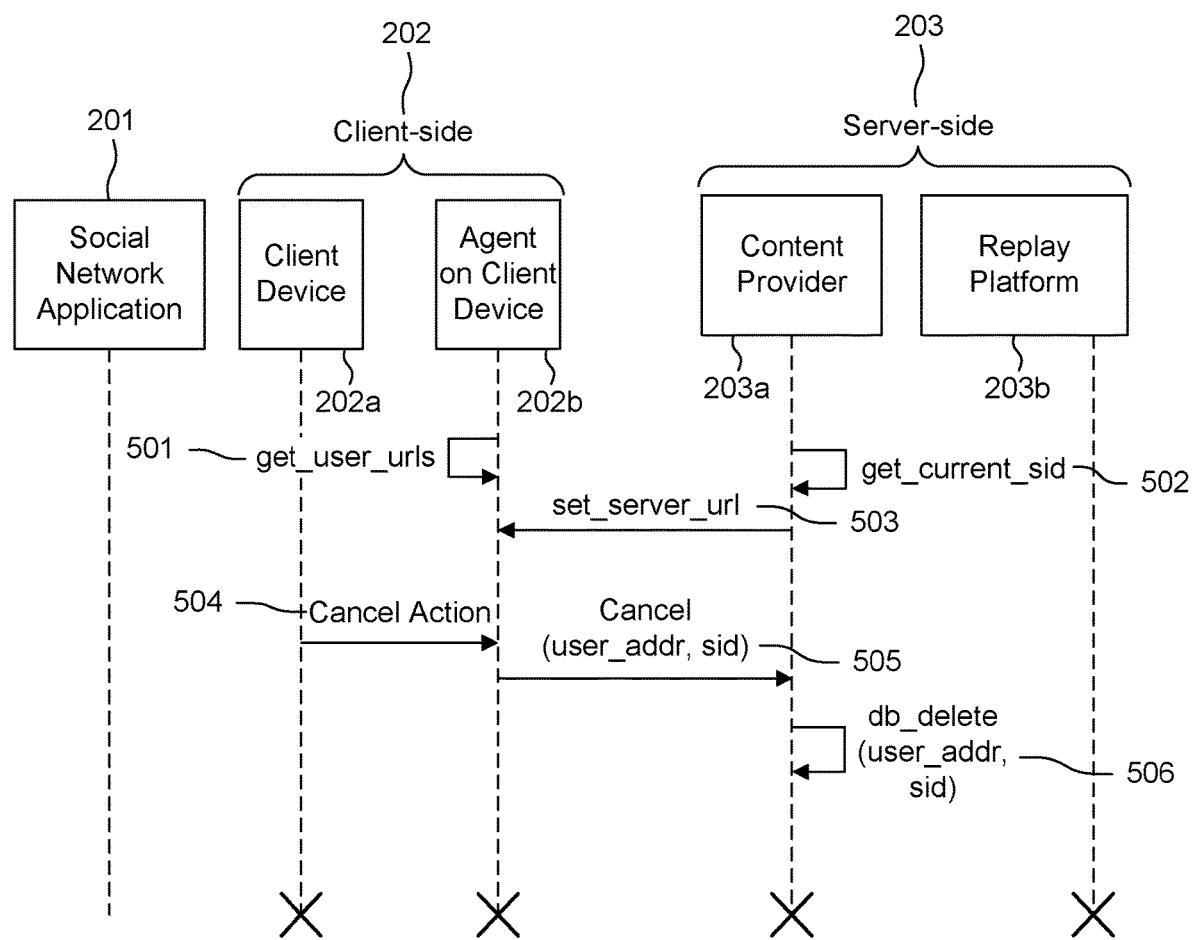
FIG. 5 is a sequence diagram of an embodiment of a cancel action related to the semi-pull mode share action.

A user (client device) may cancel any former share actions. An embodiment is illustrated with the help of sequence diagram FIG. 5.

As per the share action, the Agent 202*b* and the Content Provider 203*a* are involved in the same way:

Once the Agent 202*b* is activated on the client side 202, it recognizes the active user and obtains, 501, access to the user's social network account(s) locator(s).

The Agent 202*b* is also informed, 503, of the server locator associated with the Provider's service.

When the Provider broadcasts a segment from a currently broadcasted content, it memorizes the associated Segment Identifier (SID), 502, and provides, 503, the server locator that is associated with its service, see the above bullet—implementation is explained later.

On a cancel action from the Client 202*a* then:

When a Client 202*a* activates a cancel operation (i.e., by hitting a key, clicking or tapping on a graphical button, etc.), this triggers transmission of a cancel action, 504, to the Agent 202*b*.

The Agent transmits, 505, a cancel request to the Content Provider server, including the segment SID of the currently broadcasted segment and the Agent locator, which is named user_addr in the figure.

On condition of receipt of this request, the Content Provider 203*a* may delete, 506, former share actions registered from the user_addr and related to the segment identifier SID.

Full PULL-Mode

The "full pull mode" may be a preferred mode of operation when securing the system from the user's point of view. It involves as little as possible the Server-Side of the system. Data for the further sharing is stored on the Client-Side and no share action is taken outside of the Client-Side.

Figure 6:
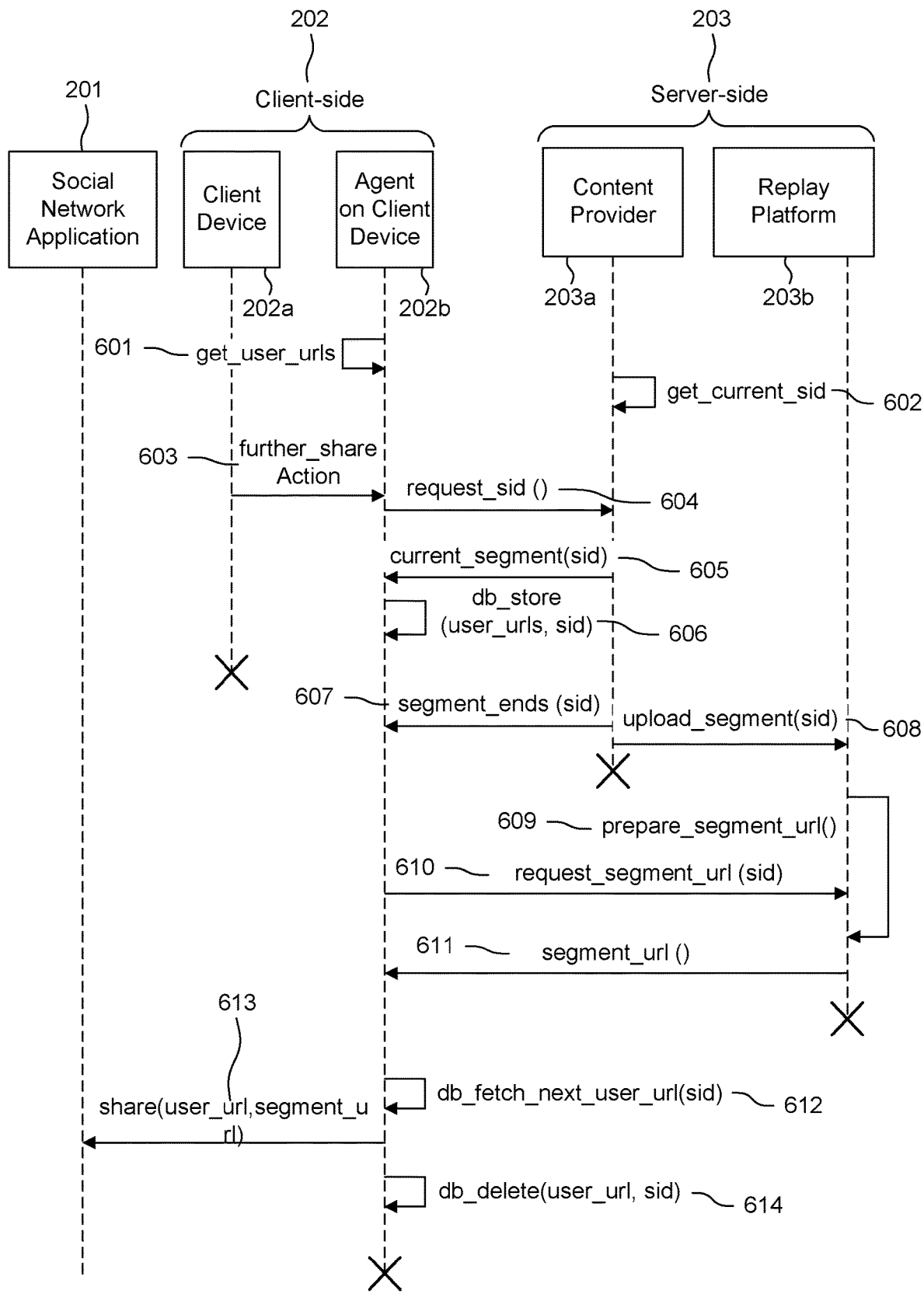
FIG. 6 is a sequence diagram of a full pull mode embodiment of a share action.

See FIG. 6. For the share action:

Once the Agent 202*b* is activated on the client side 202, the agent recognizes/identifies the user/client device and obtains, 601, access to the user's/client device's social network account(s) locator(s).

When the Content Provider 203*a* broadcasts a segment of a currently broadcasted content, it memorizes, 602, the associated Segment Identifier SID.

When a Client 202*a* activates the share action (i.e., by hitting a key, clicking or tapping on a graphical button, etc.), this triggers transmission of a further share action, 603, to the Agent 202*b*.

Once activated this way, the Agent 202*b* requests, 604, the SID of the currently broadcasted segment from the Content Provider 203*a*.

The Content provider 203*a* transmits, 605, to the Agent 202*b* the requested SID of the currently broadcasted segment.

The Agent 202*b* then stores, 606, in its local database (or memorizes, in more general terms) the user's social network account(s) locator(s) associated with the SID of the currently broadcasted segment, or stores an association of the locator(s) with the SID(s).

Once the broadcasting of the segment completes (ends), the Content Provider 203*a* may inform, 607, the Agent 202*b* of its completion (of its ending).

The Content Provider 203*a* then uploads, 608, the segment on the Replay Platform 203*b*.

The Replay Platform 203*b* then defines/creates/establishes, 609, a locator of the newly available segment and may request the social sharing of this locator to the Content Provider 203*a* (i.e., may indicate to the Content Provider 203*a* that a locator of the segment is now ready for being shared/published, for example for sharing/publishing via (a) social network application(s) of these users).

The Agent 202*b* may request, 610, the Replay Platform 203*b* to transmit the locator of the segment. This requesting may be done via polling, i.e., the Agent may periodically request the segment locator, or the segment locator is transmitted to the requesting Agent 202*b* once it is available on/uploaded to the replay platform.

Once the Agent 202*b* obtains, 611, the segment locator from the Replay Platform 203*b*, it loops through, 612, the user's social network account(s) locator(s) and may take any appropriate action, 613, to share the segment locator on the user's social network(s) account(s).

Optionally, the agent 202*b* may then delete, 614, any references to the user social network account(s) locator(s) locators stored (memorized) in step 606.

Figure 7:
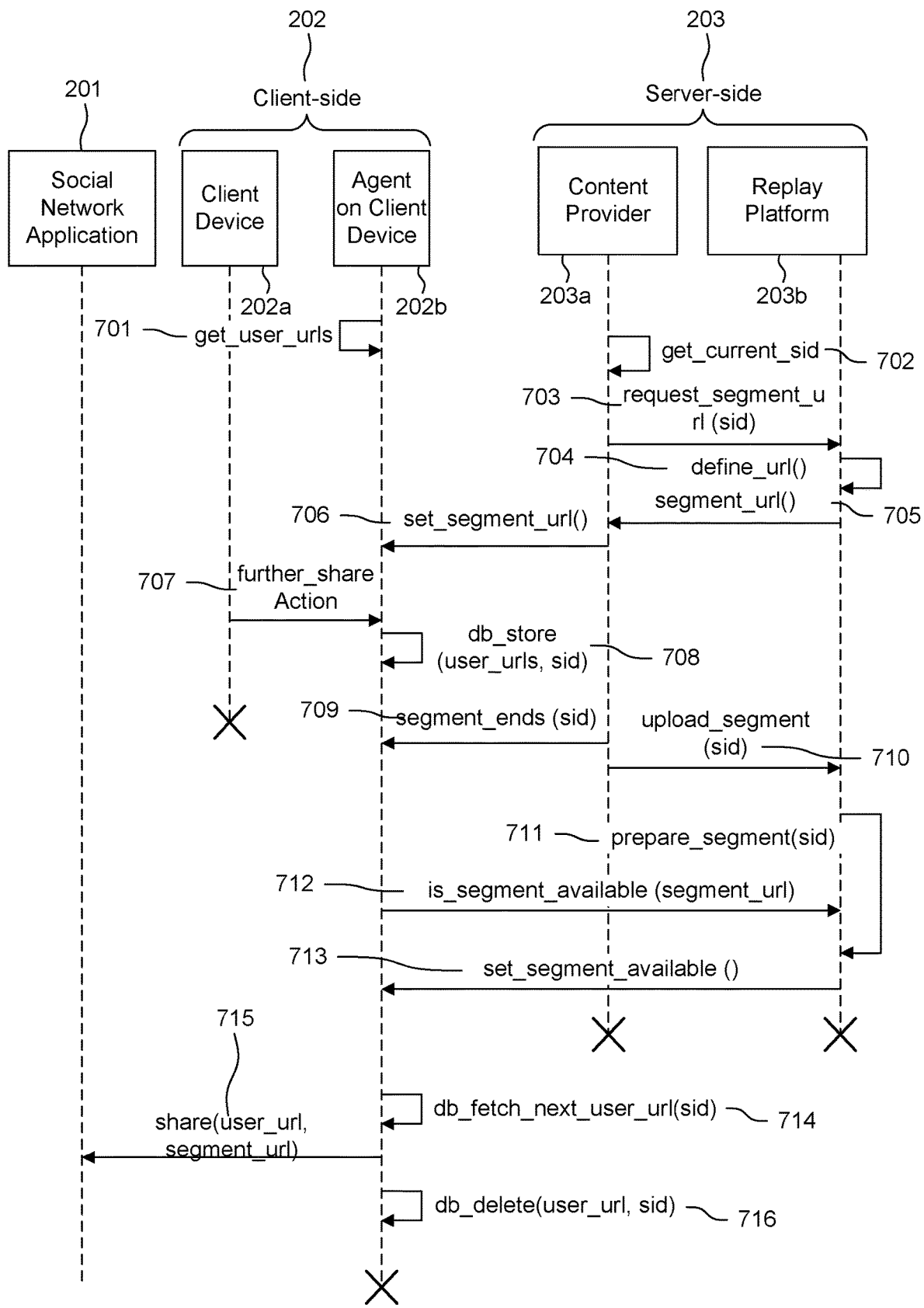
FIG. 7 is a sequence diagram of another embodiment of the full pull mode embodiment shown in FIG. 6.

According to another embodiment related to the full pull mode, ('secondary operating mode'), the sequence of operations may be as illustrated with the help of FIG. 7.

For the share action:

Once the Agent 202b is activated on the client side, it recognizes/identifies the user/client device and obtains, 701, access to the user's/client device's social network account(s) locator(s).

When the Content Provider 203a broadcasts a segment ('currently broadcasted segment') from a currently broadcasted content, it memorizes, 702, the associated Segment Identifier (SID).

The Content Provider 203a then requests, 703, the Replay Platform 203b what will be the future locator of this segment once it will have been uploaded on the Replay Platform 203b.

The Replay Platform 203b defines (creates, establishes), 704, the segment locator, memorizes it (not shown) and sends it, 705, to the Content Provider 203a, following the request 703.

The Content Provider 203a may have identified the Agent 202b when it was activated on the client side and may then send, 706, to the Agent 202b the future locator of the segment on the Replay Platform 203b.

When a client (user device, client device) 202a activates a share activation (i.e., by hitting a key, clicking on a graphical button, etc.), this triggers transmission, 707, of a further share action to the Agent 202b.

The Agent 202b then stores or memorizes, 708, e.g., in a local database, the user's social network account(s) locator(s) associated with the SID of the currently broadcasted segment.

Once the broadcasting of a segment completes (ends), the Content Provider 203a may inform, 709, the Agent 202b of its completion (of its ending).

The Content Provider then uploads, 710, the segment on the Replay Platform 203b.

The Replay Platform 203b may then prepare, 711, the segment for it to be available for sharing via the previously defined locator.

The Agent 202b may request, 712, the Replay Platform 203b for availability of a (currently broadcasted) segment for replay based on the Segment Identifier (SID). This requesting may be done by periodically interrogating the Replay Platform 203b (polling), or an indication of availability of the segment may be transmitted to the requesting Agent 202b once the segment preparation has completed on the Replay Platform 203b/once the segment has been uploaded to the Replay Platform.

Once the Agent 202b is informed, 713, of the availability of the segment on the Replay Platform 203b, the agent 202b runs through/loops/parses, 714, the user's social network account(s) locator(s) and may take appropriate action, 715, to share the locator on the user's social network(s) account(s) e.g., by publication of the locator to the segment on the replay platform in a social network application.

Optionally, the agent 202b may delete, 716, any memorized/stored user social network(s) account(s) locator that was stored in step 708.

Figure 8:
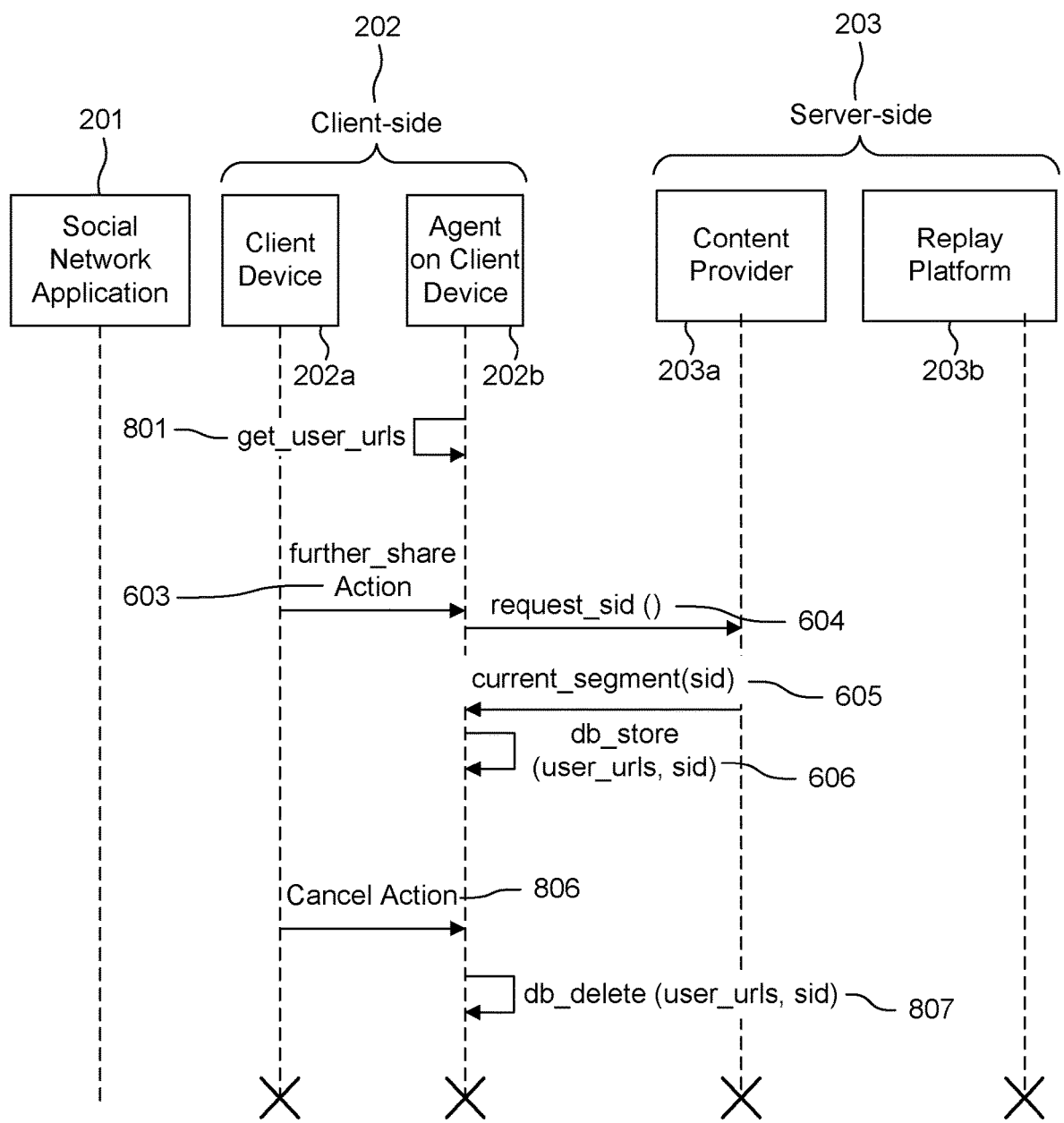
FIG. 8 is a sequence diagram of combined share and cancel actions.

When combining both share and cancel actions, the sequence diagram may be as according to an embodiment illustrated with the help of FIG. 8. This diagram shows that further_share actions may be doubled, that cancel actions may be doubled and that both types of action may be interlaced together while a segment is broadcasted. Any cancel action, 806, may delete further_share actions, 603 (see also FIG. 6), that have previously been done by client.

On a cancel action from the Client (client device) 202a:

When a client (user, user device, client device) 202a activates a cancel operation (i.e., by hitting a key, by clicking or tapping on a graphical button, etc.), this triggers transmission of a cancel action, 806, to the Agent 202b.

The Agent 202b may then delete, 807, former share actions registered from the client_addr and related to the segment identifier SID. This is done by deleting from the local database any association of a user's social network account and the SID of the currently broadcasted segment.

Embodiments on Client and Server Sides

First are described example embodiments related to ways to share content between users/devices. Then are discussed some embodiments for a system that remembers share assertions from users/devices and that further applies them to social network platforms.

Client Side

According to embodiments, a user may further-share a broadcasted live content by pressing a dedicated button on a remote control (RC). This RC may be, among others and according to example embodiments:

a) a "classical" remote control with a dedicated button for this, or b) a classical remote control where a sharing button function is attributed to an existing button (color, '*', '#', . . . ), or c) a programmed button specifically appearing on the screen of a smart remote control that runs a dedicated application, or d) a programmed button specifically appearing on the screen of a mobile device running a dedicated application, or e) a fully dedicated device used for this sole purpose, or f) the content is played on a mobile device which enables then a "share" button on the viewing application.

According to an embodiment, a dedicated button shows a logo of a social network service (e.g., a logo of Facebook ©, Twitter ©, etc.)

According to embodiments, there may be several buttons for each different social network service, each being shown and being at the disposal of the user.

In case a), if such an RC is available, pressing the dedicated button would take effect only when the played content accepts it. We explain later how a related service could be implemented.

In case b), this may be implemented, according to an embodiment, via an application running on device the classical RC is connected to. Such an application may be loaded in the device—for instance via DVB-SI or HbbTV signalization tables, programs, contents, or data associated with the program/content that is currently played.

In case c), the dedicated application may be, according to an embodiment, automatically loaded or, according to an embodiment, run on a smart RC when the program/content is played on a device, or, according to an embodiment, this dedicated application is run on user's request, or, according to an embodiment, the button is always displayed and is made enabled when the played program/content allows for its use. It is described further on in the present document how control data may be exchanged between the RC and the device controlled by the RC, to automate as much as possible this service.

In case d), the dedicated application may be, according to an embodiment, automatically loaded or, according to an embodiment, run on the mobile device (tablet, smartphone, . . . ) when the program/content is played on a rendering device (e.g., a TV rendering device, an audio rendering device, a video/audio rendering device), or, according to an embodiment, when it is run on user request, or, according to an embodiment, while the button is always displayed and is made enabled when the played program/content allows for its use. It is described further in the present document how control data may be exchanged between the mobile device and the rendering device to automate as much as possible this service.

In case e), this may be any device with at least a single button (or a single selection means) and may be a microphone. It is described further on in the present document how control data may be exchanged, according to embodiments, between such device and a rendering device (e.g., smart TV) to automate as much as possible this service.

In case f), the program/content may be played on a connected displaying mobile device which runs a playing application. According to embodiments, the "share" button may then be shown or be made enabled for the user to tap on it when the played program/content allows this functionality.

According to embodiments, the user may set the social network platform the user wants to further share the currently played live program/content on, and moreover via what signed-in account(s) the user wants to share it. A few example embodiments are listed below.

To select the social network platform on which to share currently played content:
 a) according to an embodiment, the user may hit a button figuring the targeted social network platform (logo, name, etc.). These targeted platforms may be many. When selected, they each may be shown with a validated checkbox or any other kind of validated-status item. The user may uncheck any or all of them at will, or
 b) according to an embodiment, the user may have previously set her/his own profile for this type of further-sharing, having formerly used an application dedicated for this, run on a TV, on a smart RC, on the mobile device used (smartphone, tablet, . . . ), etc. This profile may be superseded by case a) above, or
 c) according to an embodiment, the user may pronounce the name(s) of the social network platform(s) in a microphone of a device.

Furthermore, the user may be clearly identified, to identify the signed-in accounts to use for the further-sharing:
 a) according to an embodiment, the user previously signed in on social network platforms, or
 b) according to an embodiment, the user has access to a user directory with photos identifying persons (e.g., family members) that has been previously configured and that is available on any of the devices the user has access to (e.g. TV picture-in-picture, smart RC display, smartphone screen, . . . ), or
 c) according to an embodiment, the user is detected by a camera placed at a rendering device (e.g., TV set) location—either recognized, or proposed for validation in case of many recognized users, or
 d) according to an embodiment, the user is using her/his own smartphone while the user has formerly set the social network platforms on which the user wants to further-share live content, or
 e) according to an embodiment, the user is using a connected mobile device with an embedded camera (this may be a smart RC) and takes a picture of his/her face, Once the user has pressed or tapped the "share" button, this action may be remembered, associated with the user's social network platform accounts, to later take effect.

Moreover, if a hand-held device (e.g., smart phone) or a rendering device (e.g., TV set) is equipped with a microphone, the further-sharing may be voice processed. Pronouncing words like "share on Anatole's facebook" may trigger the process of asking for the further-sharing of the currently played content on the Facebook © account of user Anatole. Voice speaker recognition may even help, either for the validation of the process or to not have to declare who is the speaker to the system. It may be that the user will have to press a button before starting to speak in the microphone. The user may also have to validate his/her choice to complete a vocal command.

When the hand-held device or the TV set embeds a camera, gestures may as well trigger the processing of the further-sharing and maybe its validation, according to specifications that are out of scope of this invention and could be left to the decision of service providers.

According to an embodiment, a share action may be triggered by showing a pictogram to a camera (a camera associated with the rendering device, the RC, the smartphone or the tablet, etc.). Examples of such pictograms are:
 a logo (of the social network platform on which to further share the live content)
 a name (of the social network platform or of the social network account to address)
 a QR code (may be embedding the social network account (s) of the user to address)
 any dedicated pictogram provided to the user by the service provider.

Client Side Share Action

Figure 9:
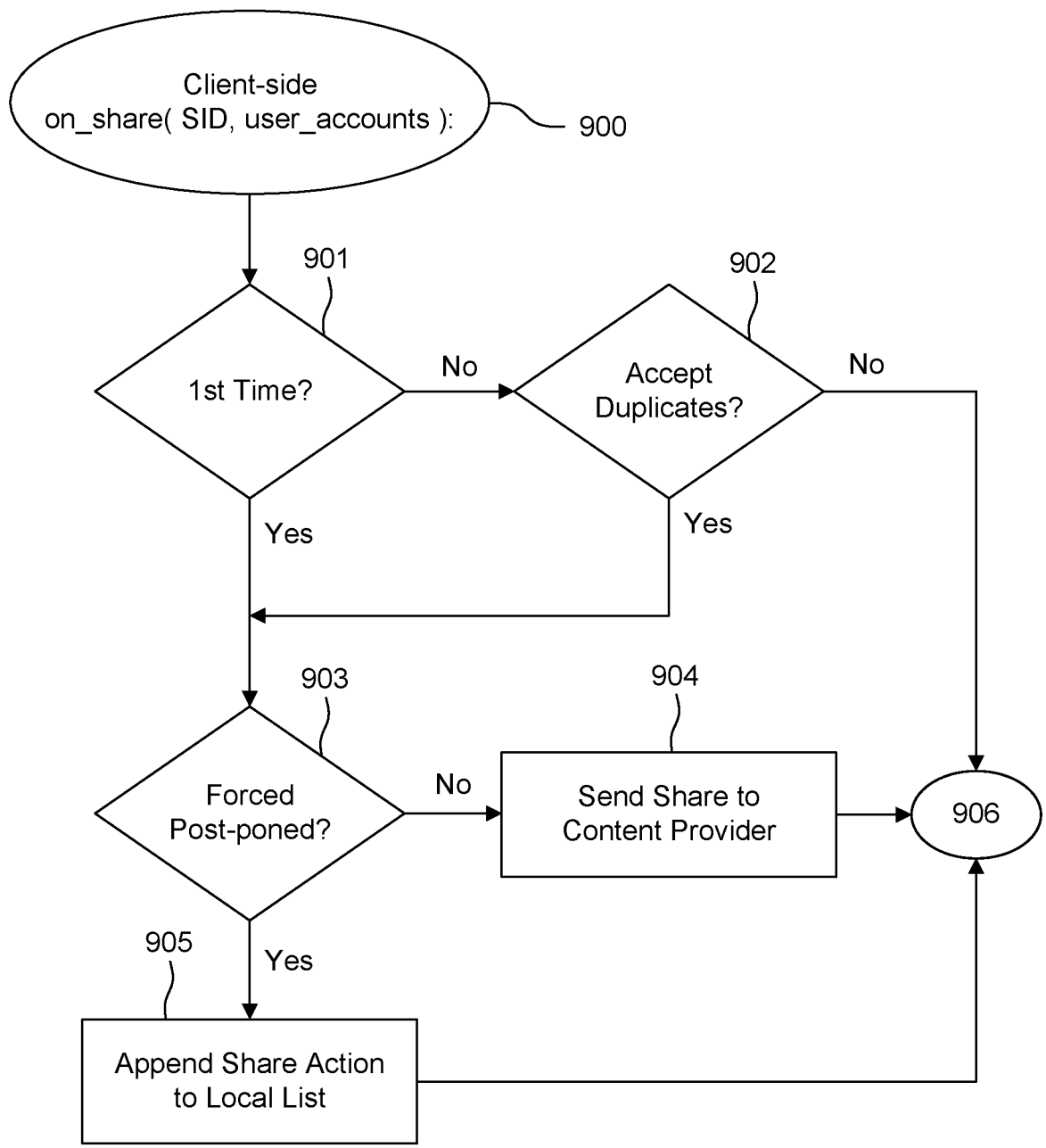
FIG. 9 is a flow chart that further illustrates an embodiment of a share action on the client device side.

FIG. 9 is a flow chart that illustrates an embodiment of a share action on the client (client device, user device) side.
 If this is the first share action for the related SID, 901, then either the share actions may, for example, be postponed, 903, in which case this share action is appended to a local list of share actions, 905, or the share actions may not be postponed, 903, and this share action is sent to the Server Side (Content Provider), 904.
 If this is not the first share action for the related SID, 901, then either the system may accept duplicates on share actions, 902, and the process described in the previous bullet may take place, or the system may not accept duplicates on share actions, 902, in which case no action is taken.
 The share actions on the client side ends, 906.

Client Side Cancel Action

Figure 10:
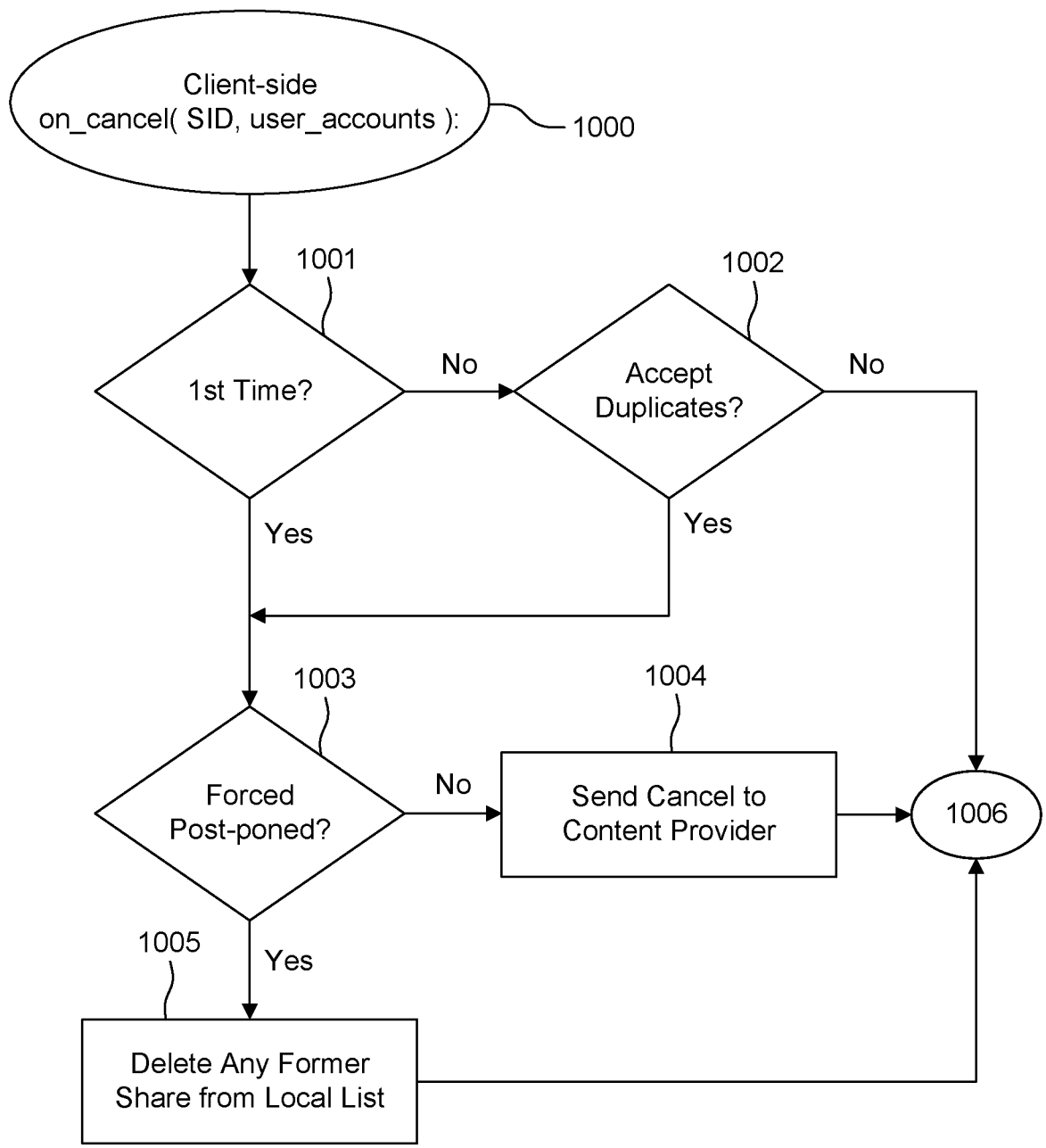
FIG. 10 is a flow chart that illustrates an embodiment of a cancel action on the client (device) side.

FIG. 10 is a flow chart that illustrates an embodiment of a cancel action on the client (user device, client device) side.
 If this is the first cancel action for the related SID, 1001, then either the cancel actions are to be postponed, 1003, in which case this cancel action may, for example, be appended to a local list of cancel actions, 1005, or the cancel actions are not to be postponed, 1003, and this cancel action may be sent to the Server Side (Content Provider), 1004;
 If this is not the first cancel action for the related SID, 1001, then either the system accepts duplicates on cancel actions, 1002, and the process described in the previous bullet may take place, or the system does not accept duplicates on cancel actions, 1002, in which case no action is taken;
 The cancel actions on the client side ends, 1006.

Client Side on Segment End

Figure 11:
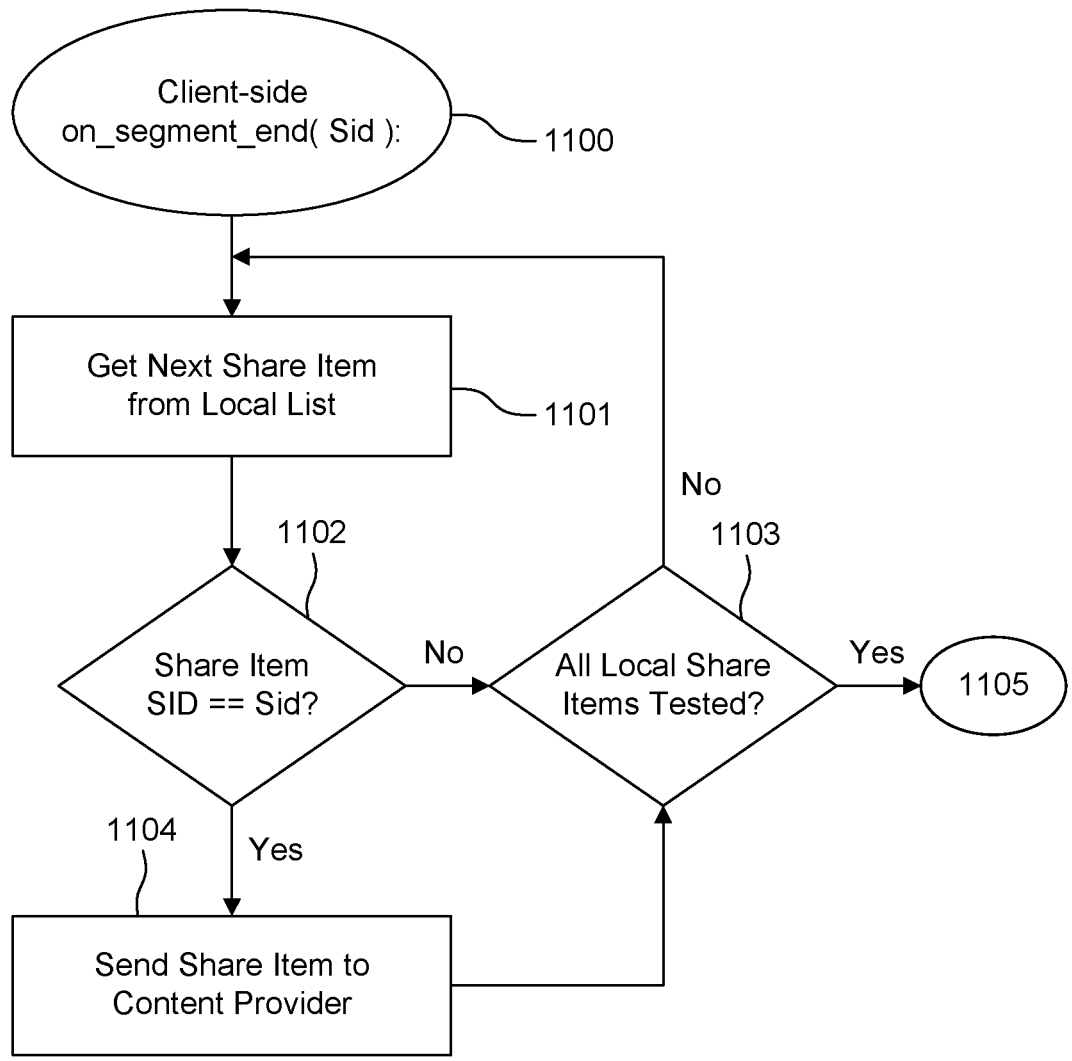
FIG. 11 is a flow chart that illustrates an embodiment when the end of the broadcasting of a sequence is signaled to the Client-Side while share actions have been requested and are postponed by the Content Provider.

FIG. 11 is a flow chart that illustrates an embodiment when the end of the broadcasting of a segment is signaled (indicated, notified) to the Client-Side while share actions have been requested and processing of these is postponed by the Content Provider.

- If any share action is contained in the local list of postponed shared actions, a next one of them is obtained, 1101;
- If the obtained share action relates to the last completed live-content segment, 1102, it is sent to the Content Provider (Server Side), 1104;
- If the obtained share action does not relate to the last completed live-content segment, 1102, it is not sent to the Content Provider;
- In any of the two previous cases, it is verified whether there is a next postponed share action, 1103. If any is available (1103—no), the method loops back to step 1101. If no more postponed share action is available (1103—yes) the process completes, 1105.

Server Side

According to embodiments, things that may be done before further sharing of content:

1. identification of the currently played content,
2. storing of data associated with the action of the user, for it to be later used by the system for the completion of the sharing action.

Then, 3. cancellation may be available to the user.

Finally, 4. actions may be taken to complete the sharing once the content to-be-shared has been uploaded by the content owner on the related Web platform.

1. Identification of the Currently Played Content

Identification of currently broadcasted (played) content may be used to obtain knowledge about what is the part of the content that may later be shared on a user's social network accounts. Returning to cases a) to f) above, when user was pressing a button to activate the further-sharing process:

a) A "Classical" Remote Control with a Dedicated Button for this

There, the currently played program/content/content segment may be known from the receiving device, the time of the press/hit may also be. This information is then easily associated together and stored by, according to embodiments:

- in the memory of the receiving device, or
- in a cloud, or
- partly in the memory of the receiving device and partly in the memory of the RC, both associated with a unique ID to later ease the retrieval of the association between both parts of this information, or
- in the cloud from the receiving device and into the RC memory itself, associated with a unique associated ID, when the RC and the receiving device are both connected to a cloud.

b) A Classical Remote Control (RC) for which any Existing Button (Color, '*', V, . . . ) is Understood by the Receiving Device as the Sharing Button Here again, the currently played program/content/segment may be known from the receiving device, the time of the press/hit may also be. This information may be associated and stored as described above for their later retrieval.

c) A Programmed Button Specifically Appearing on the Screen of a Smart Remote Control that Runs a Dedicated Application The same as above applies also in this embodiment. Meanwhile, the RC being a smart device running an app, this app may be able to store for its further sharing with the system, or to send it immediately to some Server-Side server, or to send it to a dedicated app that would run on the receiving device.

d) A Button Specifically Appearing on the Screen of a Mobile Device Running a Dedicated Application This is as embodiment of case c) above, but with a similar application running on a smartphone or a tablet rather than on a smart RC. The device may be capable of showing enabled/disabled buttons. It may embed electronics that allow for the storing in memory and maybe also for the connection with networks. Here again, the currently played program/content/segment may be known from the receiving device, the time of the press/hit may also be. This information may be associated and stored as described above for their later retrieval.

e) A Fully Dedicated Device Used for this Sole Purpose

A fully dedicated device may embed any of the functionalities described in previous embodiments. According to any of the previous embodiments described above that such a fully dedicated device would implement, the device may act as described in the related case described above.

f) The Program/Content/Segment is Played on a Mobile Device which Enables then a "Share" Button on the Viewing Application In this embodiment, the playing application may identify the played program/content/segment, may identify the user or client (device), may know the time within the played content of the further-share hit, may know what are the social network accounts of the user/client device. Either these will have been formerly validated as to be used for the further-sharing functionality, or their logos (for instance) may be made available for validation (enabled/disabled for instance too) at any display time.

In the case of voice or gestural sign triggering, above embodiments still apply. If the rendering device is equipped for that, it runs the process of storing and sending the related data structure to some service provider Server-Side. If the hand-held device is fully equipped for that, it does the work by its own. If both devices (hand-held device and rendering device) share capture equipment and connection to implement the service, the descriptions in the above list of embodiments fully apply. If implemented this way, and if the hand-held device is not connected to an external network but is just connected to the rendering device, the hand-held device may store the data, then transmit the data to the connected rendering device for it to transmit the data to the service provider side (e.g., server).

2. Storing of Data Associated with the Action of the User/Client Device

First, this is the description of data that may be used to implement embodiments. What follows is a data structure, shown in the JSon format. Text appearing between '<' and '>' is to be replaced with the true data text, while texts between double quotes are labels for which text content may be specified and modified by service providers (e.g. "segment ident" may be replaced with "SID").

```
{
  "segment_ident": "<segment name or identifier>";
  "sharing_hit_datetime": "<local system time on playing device>";
  "sharing user-accounts": [ "<social network account identifier>",
      "<another social network account id>", ... ];
}
```

Any additional data may be added to this, if of use for the service providers.

Here is an example, with shortened labels to "limit" bandwidth:

```
{
  "SID": "Daily News Sequences";
  "date": "2020-04-06T19:42:42UTC+02:00";
  "acc": ["https://www.facebook.com/anatole.anatolios",
  "https://www.youtube.com/channel/gBZH01234567899876543210"];
}
```

The stored data may allow for the retrieval of the part of the content that is being played/broadcasted and that has been tagged to be further shared by the user/client device. If the segment-ID only contains a string with the name of the segment, the system may access an association table which associates the content provider Server-Side locator (or the like) with the segment-ID. A way to achieve this, among others, is to embed these association tables within a broadcast stream, in DVB-SI tables or as data transmitted via HbbTV application, for instance.

The user/client/user device/client device that requests further sharing may need to be identified. Embodiments for implementing this have been described. When a shared hand-held device is used, this means that once the further-sharing user/client/user device/client device has been identified, an internal formerly initialized table stored in a non-volatile memory may then be used to get access to the social network account(s) associated with this user/client/user device/client device.

The structure of such a table, within a family context for instance, could be like this (JSon format):

```
{
  "<user_1>": ["<social network account identifier>", ...];
  "<user_2>": ["<social network account identifier>", ...];
  ...
  "<user_n>": ["<social network account identifier>", ...];
}
```

Example

```
{
  "dad": ["https://www.facebook.com/kostas.anatolios"];
  "mom": ["https://www.facebook.com/eleni.anatolios",
      "https://www.instagram.com/ele.ana"];
  "anatole": ["https://www.facebook.com/anatole.anatolios",
      "https://www.youtube.com/channel/gBZH01234567899876543210"];
}
```

As an embodiment, the textual identifier of a user may be replaced or associated with a picture of the user's face. Face recognition systems may fit the need.

As an extension of the described embodiments, when the user is using a mobile connected device that embeds a camera, a microphone or both, there is no need for the connection of this hand-held device with a TV set. The described embodiments may be used outside, out of home, or the like.

The device captures sound and stores a signature of this sound associated with the date and time.

Or the user captures image shots or a short video of the display the user is in front of, which leads again to some video signature that can be associated with date and time.

In both cases, in the case of a live broadcasted content, it may be possible to recognize it as such and the further-sharing service can take place. The way this recognition is implemented is out of scope of this invention. Sound and video signatures are well known technologies that can be applied according to embodiments to implement the service.

Figure 12:
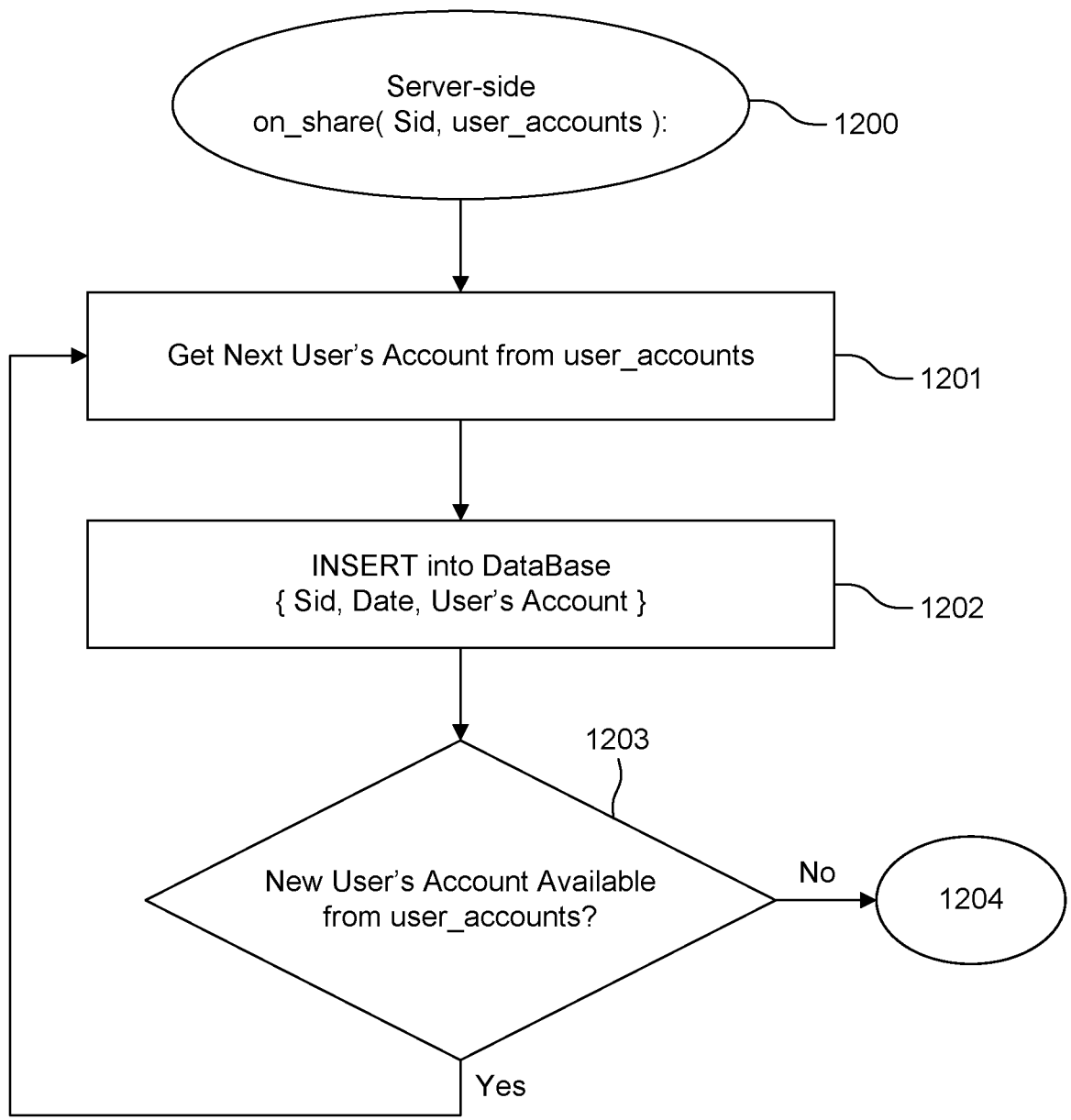
FIG. 12 is a flow chart of a method, according to an embodiment, of sharing content when a user triggers a further-share action.

FIG. 12 is a flow chart of a method, according to an embodiment, of sharing content when a user triggers a further-share action. A similar flow chart (not shown) is applicable when the Agent sends its locator rather than the user's social network account locators; as shown in the sequence diagrams presented earlier in this document (e.g., FIG. 4), user_accounts (client_accounts) may then be replaced in this figure with user_addr (client_addr). The method may be implemented on the Server-Side (i.e. on the Content Provider side) in the system:

select a user social network account, 1201, from the list of the user's social network accounts;

Store the selected social network account in the Server-Side database (or storage, or memory), optionally associated with the Segment Identifier SID of the content segment that is to be shared, and optionally associated with the date and time of the share triggering as actuated by the user, 1202;

Under condition that the list of user's social network accounts has not been fully processed, 1203, loop back to step 1201;

The method completes when the user's social network accounts have been processed, 1204.

3. Cancellation of the Sharing

According to an embodiment, a user may cancel a further sharing at any time before it takes place, i.e., when the further sharing has been activated by the user/client (device) but is (validated by the system and) pending in the system. For this, a simple press, key hit, click or tap on a "share" button, tagging, or unchecking a checked checkbox may invert a further sharing selection according to embodiments, which consequently cancels the sharing demand (request). According to an embodiment, under condition that a further-sharing was not completed before a next demand for a new further-sharing, the system may manage a list of currently pending further-sharings that can individually be cancelled/validated again at will. According to an embodiment, once a sharing is finally available on the account(s) of the user, the user may later edit them as on the related social network platforms.

Figure 16:
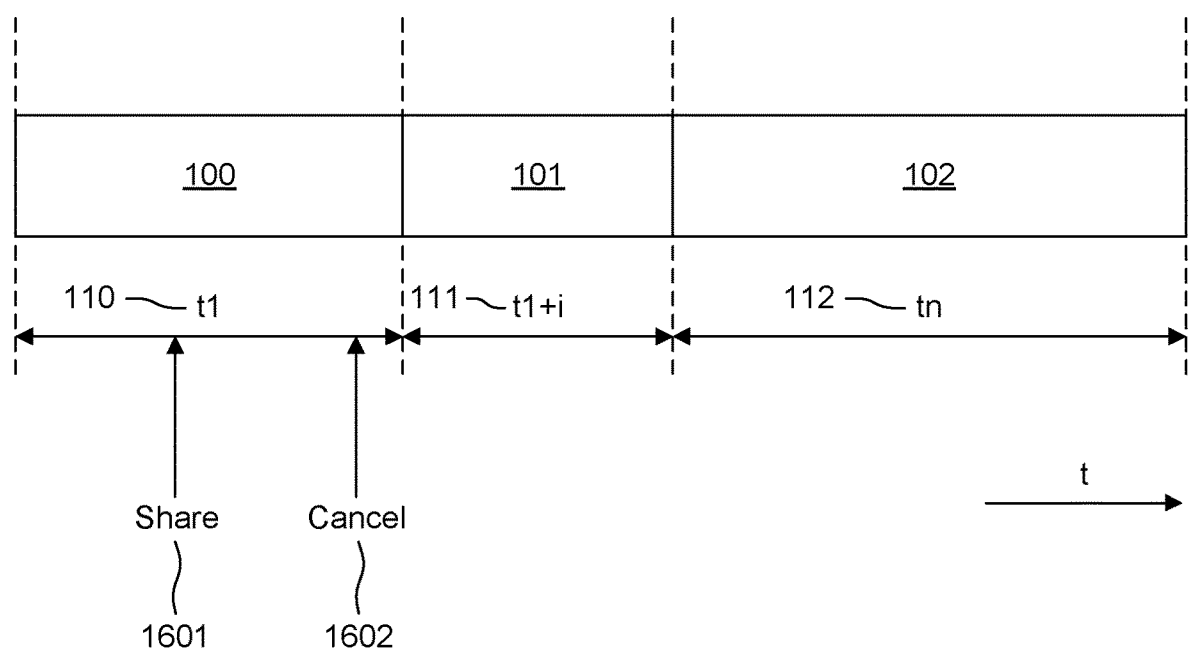
FIG. 16 is a timeline illustrating a content being a succession of events or segments similar to those of FIG. 1, further illustrating some possible moments for triggering a sharing action and for cancelling a triggered sharing action.

According to an embodiment, a further sharing cancellation may take place at any moment during the live broadcast of the tagged-as-shared segment of a content ('tagged segment'). According to an embodiment, it can be cancelled until the segment ends, see FIG. 16, similar to FIG. 1, showing a share action 1601 followed by a cancel share action 1602 before segment 100 ends.

As soon as a next segment (e.g., segment 101, referring to FIG. 16) of a live content starts, a cancellation of a previously broadcasted segment (e.g., 100) can still be performed, for example according to the following embodiments:

By accessing a list of segments that have been tagged by the user for sharing but that are not yet rendered available on a replay platform (and that may thus not yet being shared on the user's social network accounts), and by unchecking the desired segment for instance, or By removing the shared links on the social network application platforms, once the user is logged-in on these platforms.

This second way may be a last possibility available once the tagged segment has been uploaded by the content provider on its replay platforms and once this segment will have been shared on the user's social network accounts. According to embodiments, a cancellation of a previously tagged segment that is not yet shared involves a dedicated application that may be executed on a device (e.g., smart TV—accessed via an RC), or on a smart RC, or on a mobile device such as a smartphone, a tablet or a dedicated device. Such dedicated cancellation application is not further described in this document.

According to an embodiment, to avoid any misinterpretation of the user's intent, a cancellation action may not be triggered in the same way as a corresponding further-share action took place. According to embodiments, a cancellation may be requested via a dedicated H/W button on a device; by a dedicated and enabled virtual button in an application; by a specific gestural sign as captured by a camera; by showing a specific cancellation pictogram to the camera of one of the devices (e.g., TV set, smart RC, smartphone, tablet, dedicated device).

An example structure for the data associated with a cancellation action is provided:

```
{
   "segment_ident": "<segment name or identifier>";
   "sharing_hit_datetime": "<local system time on playing device>";
   "sharing user-accounts": [ "<social network account identifier>", ... ];
   "cancellation": "True" ];
}
```

And an example of such data:

```
{
   "SID": "Daily News Sequences";
   "date": "2020-04-06T19:42:43UTC+02:00";
   "acc": ["https://www.facebook.com/anatole.anatolios",
"https://www.youtube.com/channel/gBZH01234567899876543210"];
   "cancel": "" ];
}
```

Figure 13:
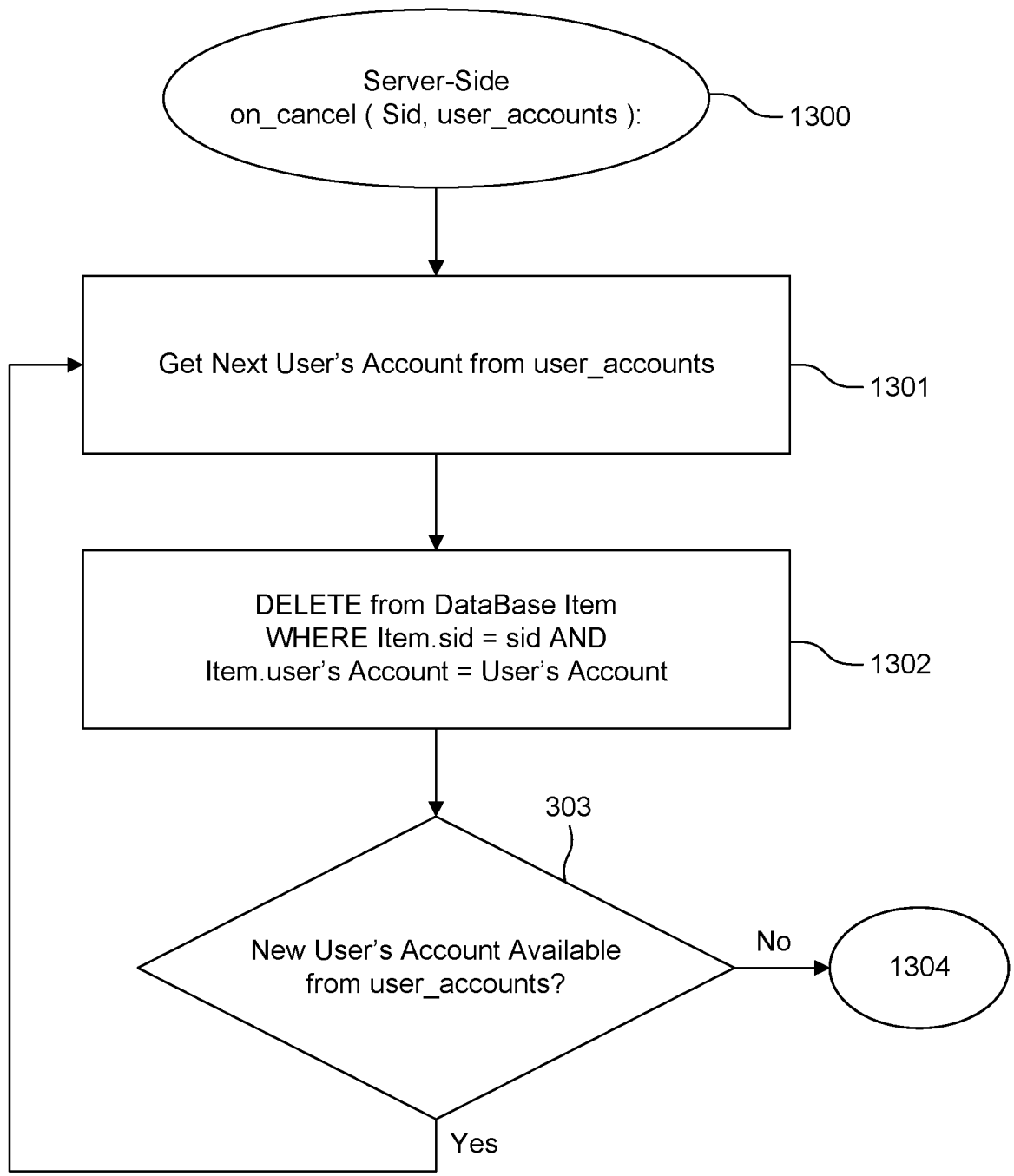
FIG. 13 is a related flow chart of an embodiment of a method for cancelling a further-share action on the server side.

A related flow chart of a method of cancelling a further-share action on the server side (content provider side) is depicted in FIG. 13. A similar method is applicable when the Agent sends its locator rather than the user's social network account locators; as mentioned previously, user_accounts (client_accounts) in this figure may then be replaced with user_addr (client_addr):

select a social network account, 1301, from the user's list of social network accounts;

Delete the selected social network account in the Server-Side database (or storage, or memory), 1302;

Under condition that the list of user's social network accounts has not been fully processed, 1303, loop back to step 1301;

The method finally completes when the user's social network accounts have been processed, 1304.

4. Completion of the Further-Sharing

To complete any triggered further-share, the content provider (service provider) may take actions on the server side. The content provider's (service provider's) Server-Side centralizes triggers and reacts to them. On the Client-Side the triggering application ('servicing application'), which is running on the user's (client) device(s), collects the local triggers and may send them to the Server-Side.

Sending the Further-Share Triggers and the Cancellation Triggers

The servicing application, running on the Client-Side, receives the triggered further-share commands from the users' (client device) connected devices. These commands may be set according to the JSon representation shown in the previous sections.

The user's connected devices may obtain the (service provider (server), content provider (server)) locator to which they may want to send the data. This locator may be provided by the content provider (i.e. the Server-Side) via the broadcasted stream, in tables or data as specified in DVB-SI or HbbTV standards, for instance. This locator can also be provided via other means, for instance at the initial registering of the user/client device to the sharing service and memorized/stored on the related user's connected devices.

Once this locator has been obtained, the Client-Side servicing application may send to the service provider's Server-Side the data associated with any further-share trigger and or the data associated with any cancellation trigger, for example as soon as possible.

According to an embodiment, this sending may be postponed until the end of the playing of current segment, which would avoid sending any data if cancellation occurs. But the service may still wish to send further-sharing triggering to avoid bursts of data that are received at end of segments as well as for statistics purposes. The postponing may be a fixed parameter of the service as well as a varying one, in which case a dedicated command or control data may be transmitted to the servicing application via dedicated channels (e.g., using DVB-SI or HbbTV data, segments, tables, etc.)

An example of such data, provided by the service provider to the end-user servicing application, could be (in JSon format):

```
{
   "postpone": true; // or false
}
```

This may be shortened by using any shorter command name ("pp" for instance) and using single letters e.g., CT and 'F' for the status of this command.

According to another embodiment, same triggers are not sent successively: for example, neither two successive further-share triggers nor two successive cancellations. But the Server-Side service may still wish to get ALL further-share triggers, for instance for statistics purposes. Here again, a command or control data may be provided by the service provider Server-Side to the Client-Side servicing application. An example of such data is (in JSon format):

```
{
   "accept_duplicates": "Yes"; // or "No"
}
```

This may be shortened with a shorter command name ("dpl" for instance) and the using single letters e.g. 'Y' and 'Nl'. According to an embodiment, this may also be split into two sub-commands: "accept_sharing_duplicates" and "accept_cancellation_duplicates", to allow finer statistics about interactions between users and the system.

Receiving the Further-Share Triggers and the Cancellation Triggers

These triggers (commands, user commands) may be collected on the service provider (content provider) side, i.e. the Server-Side. The received data contains the user's social network account identification, the date and time of the trigger and the type of the trigger: share or cancel.

User's social network account identification may be used as a key for the mapping of the triggers. They may be maintained on the Server-Side within a temporary database that is associated with the currently broadcasted segment or that is associated with one of the past ones according to the time at which the trigger happened.

In case of multiple triggers for a same social network account, the Client-Side may, for example, only store the last received trigger, possibly overwriting any previous ones. The service provider may take benefit of multiple triggers to evaluate statistics about interactions between the segment content and the users.

In case of a triggered cancellation, the Server-Side may just remove the related entry from the database, if there is no particular use to store it. According to an embodiment, the Server-Side may store specifics of a cancellation, for example for statistics purposes.

The Server-Side may have requested to receive commands at the end of a currently broadcasted segment. When the server-side receives (important, considerable) data bursts at broadcast segment end, the server-side may add, e.g. to the broadcast signal, an indication for the client-side to stop postponing triggers (user/client device commands)—see JSon syntax and examples that were previously discussed. In this case, the Server-Side may also add to the broadcast signal an indication to not receive duplicates of same triggers.

When the broadcast of a current segment has completed and once this segment has been uploaded on the content (service) provider's replay platform, the information related to triggers of users/client devices associated with a segment may be used by the content (service) provider.

Sharing the Uploaded Replay Segment

This is the final stage of the sharing method. Once the segment that has been broadcasted has been uploaded onto the replay platform, the locator for accessing the segment is rendered available to the Server-Side.

The Server-Side can now "share" this locator on social network platforms according to the social network account locators of the users (client devices) that have triggered a further-share action during the live broadcasting of the segment. To do so, the server-side runs through the database entries. For database entries, the server-side may validate the date and time against the start and end time of the segment live broadcast. This may help to ensure that the segment that the user (client device) wishes to share is correctly identified on the server side, for example in embodiments where the identifier of the segment is not transmitted by the client device side to the server side. The server-side obtains the user's (client device) locator and shares the (identified) segment replay locator within this user's social network platform account.

Following are listed a few, non-limited embodiments:
a) The Server-Side service posts the replay locator into the user's social network platform account;
b) The Server-Side service posts the replay locator on the social network platform associated with the user's account name;
c) The Server-Side service notifies the user on her social network platform.

Case a) may suppose that either the user allows the posting of comments on the user's social network account (e.g. Facebook ©)) or that the user has previously accepted such posting from the service provider, for instance at user registration time.

Case b) may relate to social network platforms such as Twitter ©, for instance. The service provider may post the user's account name associated with the segment replay locator. This way, the user will be notified of this post/tweet as well as the user's followers.

Case c) apply to users that have not allowed (automated) publishing on their social network accounts or have not accepted that the service provider does so. The service provider then just posts the locator corresponding to segment replay on its own account on the same social network platform, for the user to be later and automatically notified of the replay segment availability. This is like case b) but for platforms such as, for example, Facebook ©.

The service provider may take above actions at any time they decide to. This may be done immediately after the uploading of the segment on the replay platform. It may also be done later.

According to an embodiment, once any share trigger has been processed on the Server-Side, the related entry may be removed from server-side storage (e.g., memory, database). In the meantime, due to transmission delays for instance, it may be that new triggering commands are received and stored (e.g., in the same database). The service provider may also delay the processing of these entries, for any reason. So, the database entries may be deleted when entries (e.g., some, every, all) have been processed.

The service provider may nevertheless flush the remaining entries at any time, in which case the associated sharing actions will not be processed.

Figure 14:
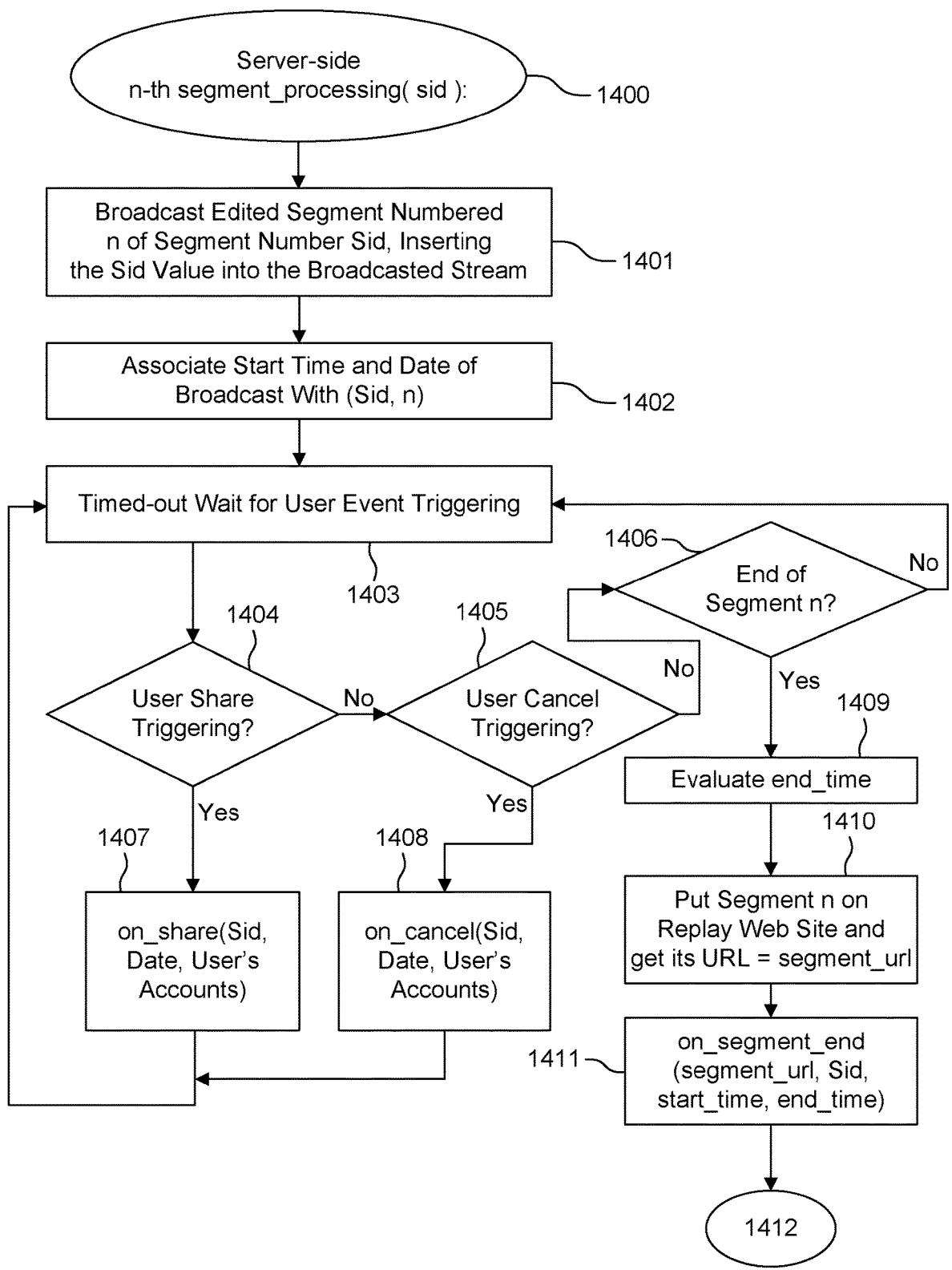
FIG. 14 is a flow chart of an embodiment of a content segment processing on the server side.
Figure 15:
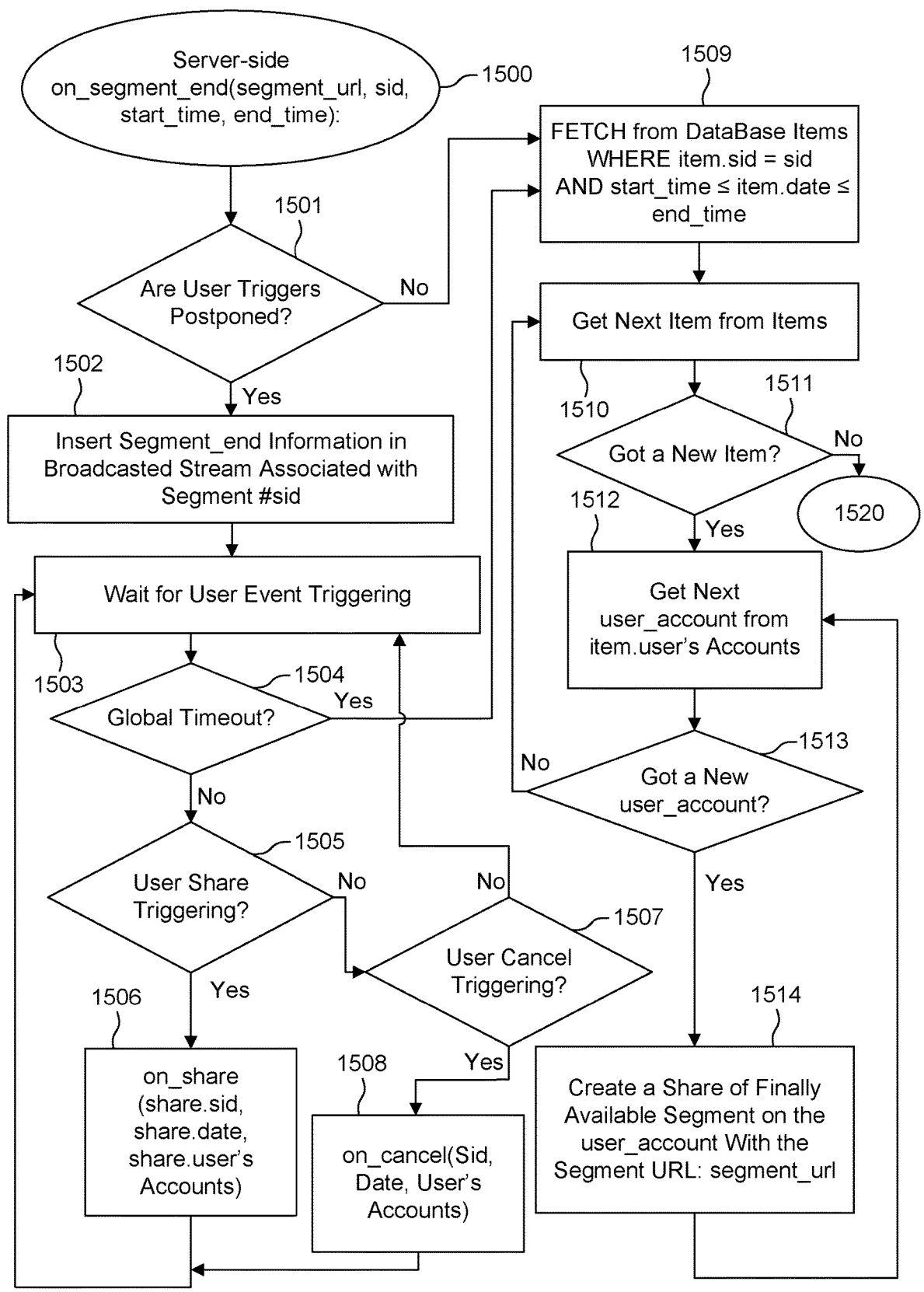
FIG. 15 illustrates an embodiment of a method for sharing content implemented on the server side once a segment has been uploaded to the content provider's replay platform and once the provider retrieved its locator.

The two next flow charts, FIG. 14 and FIG. 15, show methods for sharing content on the Server-Side side.

While broadcasting the n-th segment of a content (e.g., a live content), and while receiving further-share and cancel requests from users/client devices (i.e. from Agents), the Content (Service) Provider may proceed like depicted in FIG. 14:

For a currently broadcasted (live) segment numbered n and associated with a Segment Identifier SID, 1400:

Broadcast this (live) segment (n, SID), the related SID being, for example, inserted in the broadcasted stream, 1401;

Optionally, locally associate the start time and the date with this broadcasted (live) segment identifier—i.e., (n, SID), 1402;

Accept users' (client device) requests, here named event triggers (n.b., until end of the broadcasting of current (live) segment (n, SID)), 1403;

On any share action trigger, 1404, apply the server-side action on_share( ) 1407, applied to the segment SID, the date and the requesting user's (client device) list of sharing social network application accounts;

On any action trigger, 1405, apply the server-side action on_cancel( ) 1408, applied to the segment SID, the date and the requesting user's (client device) list of sharing social network application accounts;

Loop on the reception of (users', client device) triggers associated with (live) segment (n, SID) until its broadcasting completes (ends), 1406;

Once the broadcasting of this (live) segment completes (ends), evaluate its end time, 1409, prepare (obtain an locator) and put it on the replay web site, 1410 and apply the server-side action on_segment_end( ) applied to the segment locator, its PID, its start and end times, 1411;

This method ends once this last action has been applied, 1412.

FIG. 15 illustrates an embodiment of a method for sharing content implemented on the server side once a segment has been uploaded to the content provider's replay platform and once the content provider retrieved the segment locator.

When the broadcasting of any (live) segment numbered n and associated with a Segment Identifier SID ends, process this on_segment_end( ) action on the server side, 1500;

If triggering actions are postponed (on system request), 1501:
  a. Insert in the currently broadcasted stream information associated with the end of this segment, 1502;
  b. wait, 1503, for any event triggering, (1503, 1504—No), or time-out, 1504—Yes;

On a share action triggering, 1505, apply the server side action on_share( ) 1506, applied on the share action attributes SID, date and user's social network application account(s);

On a cancel action triggering, 1507—Yes, apply the server side action on_cancel( ) applied on the cancel action attributes SID, date and user's social network application(s) accounts;

On a global timeout (1504—Yes), stop any looping on trigger processing and go to step 1509 for which triggering actions are now available;

If triggering actions are not postponed (on system request), 1501—No, directly go to process 1509 since triggering actions are already available;

Once triggering actions are available, 1509, extract from the server side database or memory records (items) associated with the Segment Identifier SID of the last broadcasted live segment, check for the correctness of the triggering date and time and the start and end times associated with the related broadcasted segment;

For these records (items), 1510, which have not yet been processed, 1511, extract the related list of social network application(s) account(s) for these records, 1512;

Obtain a not yet processed user's social network application account from this list, 1513, and if available process the share action of the broadcasted (live) segment on the user's/user device/client device social network application account, using the associated segment locator on the replay platform, 1514; keep on looping (arrow from step 1514 back to step 1512) on social network application account(s) for this segment locator;

Once triggering items associated with the broadcasted live segment PID, start time and end time have been extracted from the server side database or memory, 1511, this process finally ends (1511—No), 1520.

Figure 17:
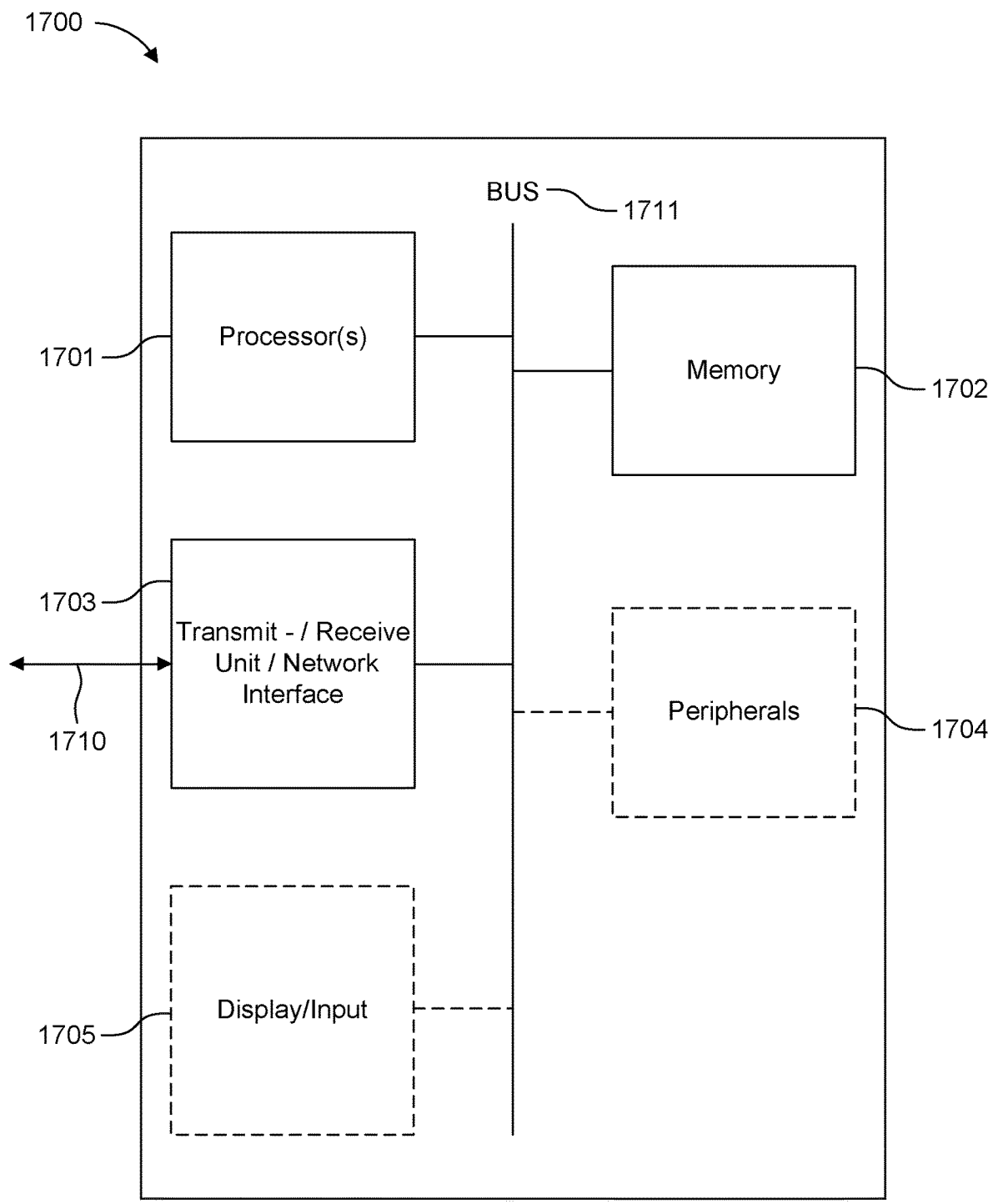
FIG. 17 is an example embodiment of a device on the Client Side (client device side, user (device) side) 202.

FIG. 17 is an example embodiment of a device on the Client Side (client device side, user device side) 202. The device corresponds for example to device 202a of FIGS. 2-8. The device 1700 comprises at least one processor 1701 configured to execute the steps of the method of content sharing according to the described embodiments. The device may further comprise a memory 1702 that may be configured to store data as well as instructions that are executable by the at least one processor 1701, for example corresponding to one of the embodiments of described methods, as well as additional applications such as an agent application (agent) 202b. One or more transmit/receive units or network interfaces 1703 may be configured to interface with a wireless network 1710 such as 3G-5G/NR, NFC, Bluetooth, or WiFi, and may be for example, configured to connect to other devices, to a LAN, a WAN, to the Internet, for connection to, for example, content provider 203a. Optionally, one or more peripherals 1704 may be configured to include a sensor, for example a camera device or microphone. An optional display/input interface 1705 may be configured to render images and to receive user input.

Figure 18:
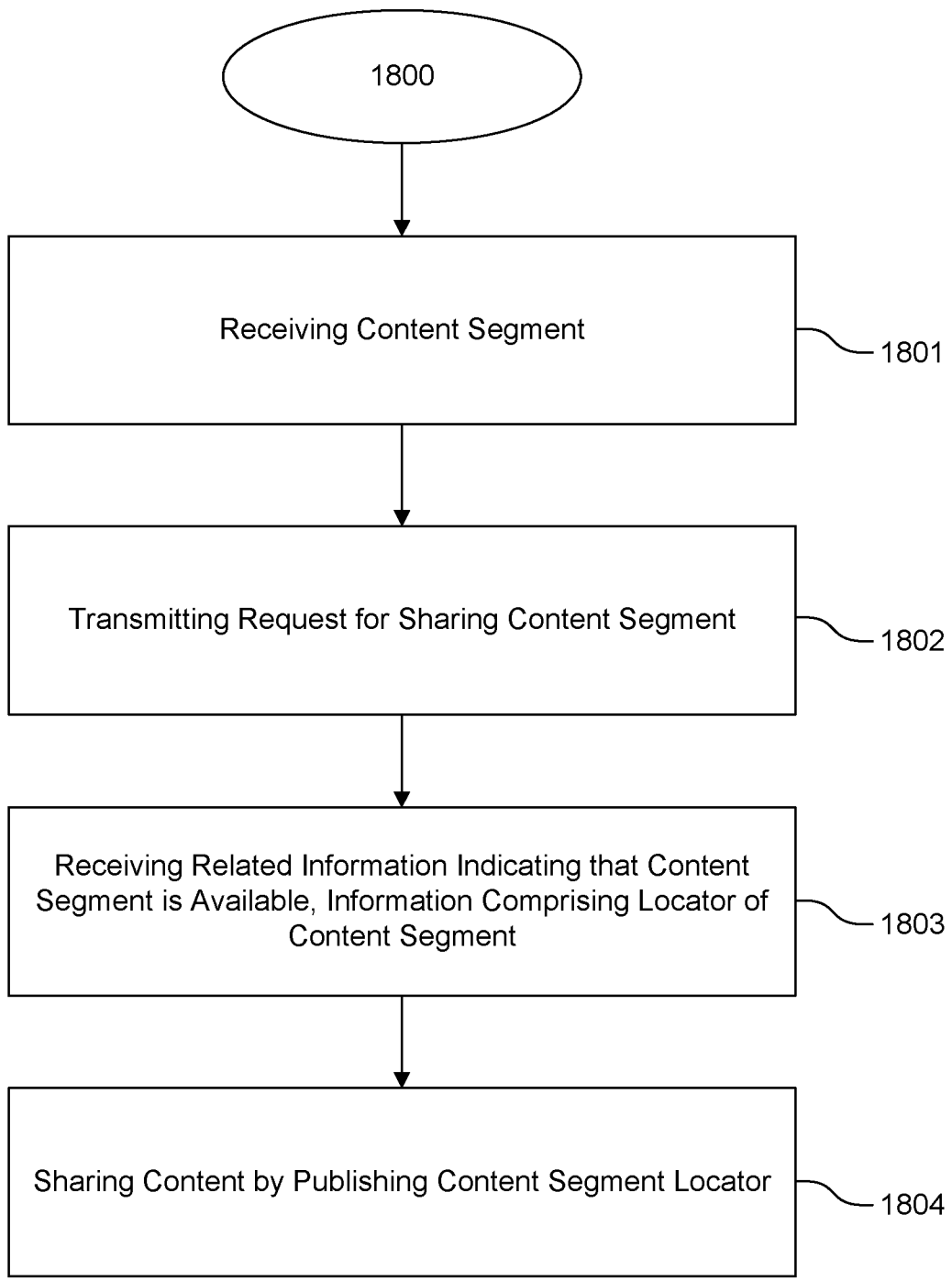
FIG. 18 is a flow chart of a method of content sharing, implemented by a user device such as 202 or 1800.

FIG. 18 is an embodiment of the method, implemented by a receiver device, e.g. 202. In a first step, 1801, the receiver device receives content (e.g., audio/video content, (live) broadcasted or streamed) from a server (e.g., from a content server), the content being split (divided, segmented) into content segments (parts). In a step 1802, the receiver device transmits, to the server, a request for sharing a content segment currently being received. This content segment is further (hereinafter) referred to as 'the content segment'. The request may include first information enabling the server to identify the content segment, the request for sharing being transmitted before the content segment ends (determined at the receiver device), i.e., before another content segment starts. The receiver device may be informed of content segment start/end through signalization received and associated with the content or the content segment (the receiver device may extract the information related to content segment start/end from the signalization received, e.g., by monitoring a segment number/identifier). The receiver may also detect itself that a content segment ends/starts by monitoring changes in the first information, e.g., a segment identifier changes when a 'new' content segment starts. In a step 1803, the receiver device receives, from the server, and after end of the content segment, second information indicating that the content segment is available (e.g., available for sharing, available for download), (e.g., available may mean that the content has been uploaded to a replay server and is available for replay). The second information may comprise a locator to the content segment on the replay server. In a step 1804, the receiver device may share the content segment (e.g., with the members of his social network application(s)) by transmitting (publishing, transmitting for publication) the locator to an application (e.g., the social network application(s)) of running on (executed by, available to, accessible by) the receiver device.

According to an embodiment, the method 1800 comprises transmitting, to the server, a request for obtaining the first information.

According to an embodiment, wherein the first information is received and extracted by the receiver device from signalization, for example from a table comprised in SI and received with the content stream or broadcast.

According to an embodiment, the method 1800 further includes transmitting an inquiry to the content server for availability of the content segment for sharing, the request including the first information.

According to an embodiment, the first information is at least one of: a time stamp of receipt of the content segment at the receiver device; an identifier of the content segment extracted from signalization that is received by the receiver device with the content segment and that is associated with the content segment.

Figure 19:
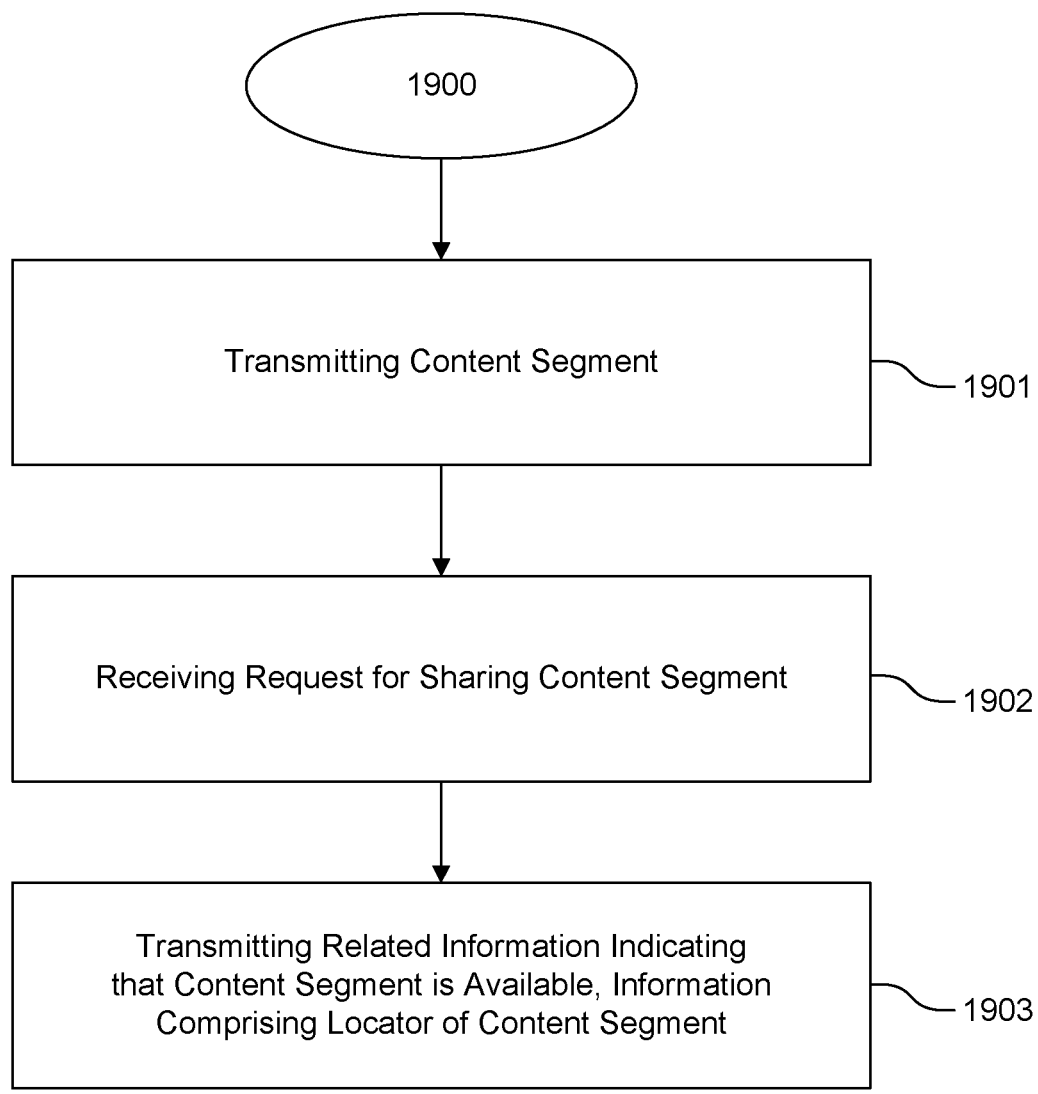
FIG. 19 is a flow chart of a method of content sharing, implemented by a server such as 203.

FIG. 19 is an embodiment of the method, implemented by a server/server device (e.g., 203), or a set of servers/server devices, e.g. 203a, 203b. In a first step 1901 content is transmitted to a receiver device (e.g., client device 202), the content being split into content segments. In a step 1902, is received, from the receiver device, a request for a locator to a segment currently transmitted to the receiver device. The currently transmitted content segment is further referred here to as "the content segment". The request may include first information enabling the server to identify the content segment of which the locator is requested. The request may be received before the content segment ends (before receipt of the content segment ends at the receiver, or before transmission of the content segment ends at the transmitter), i.e., before a next content segment starts (being received at the receiver, or being transmitted at the transmitter). In a step 1903, under condition that the content segment is rendered available for replay after the end time (at the receiver or at the transmitter) of the content segment, transmitting, to the receiver device, second information comprising the locator to the content segment on a replay server. The sharing is, for example, a sharing with the members of (a) social network (s) of a client of the receiver device (e.g., the currently identified user of the receiver device) and may be done by publishing the locator, e.g., an locator, in an application, e.g., in a social network application(s)) running on, or executed by the receiver device.

According to an embodiment, the method 1900 further includes receiving, from the receiver device, a request for obtaining the first information, and transmitting the first information in response to the request.

According to an embodiment, the first information is transmitted in signalization at destination of the receiver device or at destination of a set of receiver devices including the receiver device.

According to an embodiment, the method 1900 further includes receiving, from the receiver device, an inquiry for availability of the content segment, the inquiry comprising the first information.

Embodiments disclosed here also relate to a receiver device comprising at least one processor configured to execute the method steps of any of the above methods related to a receiver device.

Embodiments disclosed here also relate to a server device comprising at least one processor configured to execute the method steps of any of the above methods related to a server device.

Embodiments disclosed here also relate to a system comprising a receiver device and a server, comprising the steps of transmitting a content to a receiver device (202a), the content being split into content segments; receiving, by the receiver device, the content from the server; transmitting, by the receiver device, to the server, a request for a locator to a content segment currently being received, referred to as the content segment, the request comprising first information enabling identification, by the server, of the content segment, the request being transmitted before end of the content segment; receiving, by the server, the request for the locator to the content segment; under condition that the content segment is rendered available for replay after end time of the content segment, transmitting, by the server to the receiver device, second information comprising the locator to the content segment on a replay server; receiving, by the receiver device, from the server, the second information; and sharing, by the receiver device, the content segment by transmitting, by the receiver device, the locator to an application accessible by the receiver device.

According to a further embodiment of the method implemented by the above system, the first information is extracted by the receiver device from signalization received.

According to a further embodiment of the method implemented by the above system, the method further comprises transmitting, by the receiver device, an inquiry to the server for availability of the content segment, the request comprising the first information.

According to a further embodiment of the method implemented by the above system, the first information is at least one of: a time stamp of receipt, by the receiver device, of the content segment; an identifier of the content segment extracted by the receiver device from signalization associated with the content segment and received by the receiver device.

It is to be appreciated that some elements in the drawings may not be used or be necessary in all embodiments. Some operations may be executed in parallel. Embodiments other than those illustrated and/or described are possible. For example, a device implementing the present principles may include a mix of hard- and software.

It is to be appreciated that aspects of the principles of the present disclosure can be embodied as a system, method or computer readable medium. Accordingly, aspects of the principles of the present disclosure can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the principles of the present disclosure can take the form of a computer readable storage medium. Any combination of one or more computer readable storage medium(s) can be utilized.

Thus, for example, it is to be appreciated that the diagrams presented herein represent conceptual views of illustrative system components and/or circuitry embodying the principles of the present disclosure. Similarly, it is to be appreciated that any flow charts, flow diagrams, state transition diagrams, pseudo code, and the like represent various processes which may be substantially represented in computer readable storage media and so executed by a computer or processor, whether such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. Some or all aspects of the storage medium may be remotely located (e.g., in the 'cloud'). It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method, the method being implemented by a first receiver device, the method comprising:
   receiving a content stream comprising pre-segmented content;
   playing the content stream;
   receiving a trigger for obtaining a replay locator of a content segment of the pre-segmented content, associated with a currently played segment of the received content stream and transmitting, to a server device, a request for obtaining the replay locator, the request comprising information enabling identification of the currently played content segment of the received content stream;
   in response to transmitting the request, receiving the replay locator of the content segment for replay of the content segment; and
   sharing the replay locator with a second receiver device.

2. The method of claim 1, wherein the information is extracted by the first receiver device from signalization received.

3. The method of claim 2, wherein the information is at least one of:
   a time stamp of receipt, by the first receiver device, of the content segment; or
   an identifier of the content segment, the identifier being extracted by the first receiver device from signalization associated with the content segment and received by the first receiver device.

4. The method of claim 1, wherein the method further comprises transmitting an inquiry for availability of the replay locator, the request comprising the information.

5. A non-transitory computer readable medium having stored instructions which, when executed by one or more processors, cause the one or more processors to perform the method of claim 1.

6. A method, the method being implemented by a server device, the method comprising:
   transmitting a content stream comprising pre-segmented content;
   receiving, from a first receiver device, a request for obtaining a replay locator of a content segment of the pre-segmented content, associated with a segment of the content stream currently played by the first receiver device, the request for obtaining the replay locator comprising information enabling identification of the content segment currently played by the first receiver device; and
   in response to receiving the request, transmitting the replay locator to the first receiver device.

7. The method of claim 6, wherein the information is transmitted in signalization at destination of at least the first receiver device.

8. The method of claim 6, wherein the method further comprises receiving an inquiry for availability of the replay locator, the inquiry comprising the information.

9. A non-transitory computer readable medium having stored instructions which, when executed by one or more processors, cause the one or more processors to perform the method of claim 6.

10. A first receiver device comprising at least one processor configured to:
    receive a content stream comprising pre-segmented content;
    play the content stream;
    receive a trigger for obtaining a replay locator of a content segment of the pre-segmented content, associated with a currently played segment of the received content stream and transmit, to a server device, a request for obtaining the replay locator, the request comprising information enabling identification of the currently played content segment of the received content stream;
    in response to the transmitting of the request, receive the replay locator of the content segment for replay of the content segment; and
    share the replay locator with a second receiver device.

11. The first receiver device of claim 10, wherein the at least one processor transmits an inquiry for availability of the replay locator, the request comprising the information.

12. A server device comprising at least one processor configured to:
    transmit a content stream comprising pre-segmented content;
    receive, from a first receiver device, a request for obtaining a replay locator of a content segment of the pre-segmented content, associated with a segment of the content stream currently, the request for obtaining the replay locator comprising information enabling identification of the content segment currently played by the first receiver device; and
    in response to receiving the request, transmit the replay locator to the first receiver device.

13. The server device of claim 12, wherein the at least one processor is configured to transmit the first information in signalization at destination of at least the first receiver device.

14. The server device of claim 12, wherein the at least one processor is configured to receive an inquiry for availability of the replay locator, the inquiry comprising the information.

* * * * *